(12) United States Patent
Knebel et al.

(10) Patent No.: US 11,835,701 B2
(45) Date of Patent: Dec. 5, 2023

(54) METHOD FOR EXAMINING A SAMPLE, AND DEVICE FOR CARRYING OUT SUCH A METHOD

(71) Applicant: Leica Microsystems CMS GmbH, Wetzlar (DE)

(72) Inventors: Werner Knebel, Kronau (DE); Florian Fahrbach, Mannheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 170 days.

(21) Appl. No.: 17/223,128

(22) Filed: Apr. 6, 2021

(65) Prior Publication Data
US 2021/0223529 A1 Jul. 22, 2021

Related U.S. Application Data

(62) Division of application No. 16/315,175, filed as application No. PCT/EP2017/066833 on Jul. 5, 2017, now Pat. No. 10,983,321.

(30) Foreign Application Priority Data

Jul. 6, 2016 (LU) .......................................... 93143

(51) Int. Cl.
*G02B 21/06* (2006.01)
*G02B 21/00* (2006.01)
(Continued)

(52) U.S. Cl.
CPC ......... *G02B 21/06* (2013.01); *G02B 21/0056* (2013.01); *G02B 21/0076* (2013.01);
(Continued)

(58) Field of Classification Search
None
See application file for complete search history.

(56) References Cited

U.S. PATENT DOCUMENTS

| 8,834,696 B2 | 9/2014 | Kim et al. |
| 9,452,234 B2 | 9/2016 | Conroy et al. |

(Continued)

FOREIGN PATENT DOCUMENTS

| CN | 104407436 A | 3/2015 |
| DE | 10257423 A1 | 6/2004 |

(Continued)

OTHER PUBLICATIONS

Mike Friedrich et al., "STED-SPIM: Stimulated Emission Depletion Improves Sheet Illumination Microscopy Resolution", Biophysical Journal, vol. 100, No. 8, Dec. 29, 2010 (Dec. 29, 2010), pp. L43-L45, XP028192802, Elsevier, Amsterdam, NL.

(Continued)

*Primary Examiner* — Darryl J Collins
*Assistant Examiner* — Tamara Y. Washington
(74) *Attorney, Agent, or Firm* — Leydig, Voit & Mayer, Ltd.

(57) ABSTRACT

In a method for the examination of a sample the sample is illuminated in a sample plane along a sample line with an illuminating light beam. The sample is acted upon by a depletion or switching light beam, which overlaps in the sample plane in an overlap region at least partially spatially with the illuminating light beam and which has at least one wavelength suitable for depletion of the sample. Part of fluorescent light emanating from the sample plane is detected as detection light. The fluorescent light originating from outside a first subregion and a second subregion is at least partially suppressed and not detected.

24 Claims, 10 Drawing Sheets

(51) Int. Cl.
*G02B 21/36* (2006.01)
*G02B 27/58* (2006.01)
*G02B 21/32* (2006.01)

(52) U.S. Cl.
CPC .......... *G02B 21/32* (2013.01); *G02B 21/367* (2013.01); *G02B 27/58* (2013.01); *G02B 21/0032* (2013.01)

(56) References Cited

U.S. PATENT DOCUMENTS

| | | | |
|---|---|---|---|
| 9,778,329 | B2 | 10/2017 | Heidmann |
| 10,054,780 | B2 | 8/2018 | Lippert et al. |
| 10,799,111 | B2 | 10/2020 | Schmoll et al. |
| 10,831,014 | B2 | 11/2020 | Hillman |
| 2006/0033987 | A1 | 2/2006 | Stelzer et al. |
| 2011/0036996 | A1 | 2/2011 | Wolleschensky et al. |
| 2012/0098949 | A1 | 4/2012 | Knebel et al. |
| 2012/0200693 | A1 | 8/2012 | Lippert et al. |
| 2013/0335819 | A1* | 12/2013 | Cooper ............... G02B 27/58 359/389 |
| 2015/0168732 | A1 | 6/2015 | Singer et al. |
| 2015/0205087 | A1* | 7/2015 | Schumann ........... G02B 21/367 359/385 |

FOREIGN PATENT DOCUMENTS

| | | |
|---|---|---|
| DE | 102007063274 A1 | 6/2009 |
| DE | 102008009216 A1 | 8/2009 |
| DE | 102009008646 A1 | 8/2010 |
| DE | 102009044983 A1 | 3/2011 |
| DE | 102010060121 A1 | 4/2012 |
| DE | 202011110077 U1 | 11/2012 |
| DE | 102012013163 A1 | 4/2014 |
| EP | 2444832 A1 | 4/2012 |
| WO | WO 2012003259 A1 | 1/2012 |

OTHER PUBLICATIONS

L. Silvestri et al., "Confocal light sheet microscopy: micron-scale neuroanatomy of the entire mouse brain", Optics Express, vol. 20, No. 18, Aug. 27, 2012 (Aug. 27, 2012), p. 20582, XP055348754, The Optical Society, Washington, D.C., USA.

Liang Gao, "Extend the field of view of selective plan illumination microscopy by tiling the excitation light sheet", Optics Express, vol. 23, No. 5, Feb. 26, 2015, pp. 1-10, The Optical Society, Washington, D.C., USA.

Weijian Zong, et al., "Large-field high-resolution two-photon digital scanned light-sheet microscopy", Cell Research, vol. 25, Sep. 26, 2014, pp. 254-257, Nature Research, London, UK.

Florian O. Fahrbach et al., "Rapid 3D light-sheet microscopy with a tunable lens", Optics Express, vol. 21, issue 18, Dec. 2013, pp. 1-24, The Optical Society, Washington, D.C., USA.

Florian O. Fahrbach et al., "Self-reconstructing sectioned Bessel beams offer submicron optical sectioning for large fields of view in light-sheet microscopy", Optics Express, vol. 21, No. 9, May 2, 2013 (May 2, 2013), p. 11425, XP055290274, The Optical Society, Washington, D.C., USA.

Mike Friedrich, et al., "Axial resolution beyond diffraction limit ofa sheet illumination microscope with stimulated emission depletion", Journal of Biomedical Optics, vol. 20, No. 10, Oct. 2015, pp. 106006-1-106006-8, SPIE, Bellingham, WA, USA.

Kawa Mohan et al., "Three Dimensional Fluorescence Imaging Using Multiple Light-Sheet Microscopy", PLOS ONE, vol. 9, No. 6, Jun. 9, 2014 (Jun. 9, 2014), p. e96551, XP055277114, Public Library of Science, San Francisco, CA, USA.

Kevin M. Dean et al., "Uniform and scalable light-sheets generated by extended focusing", Optics Express, vol. 22, No. 21, Oct. 16, 2014, pp. 1-12, The Optical Society, Washington, D.C., USA.

* cited by examiner

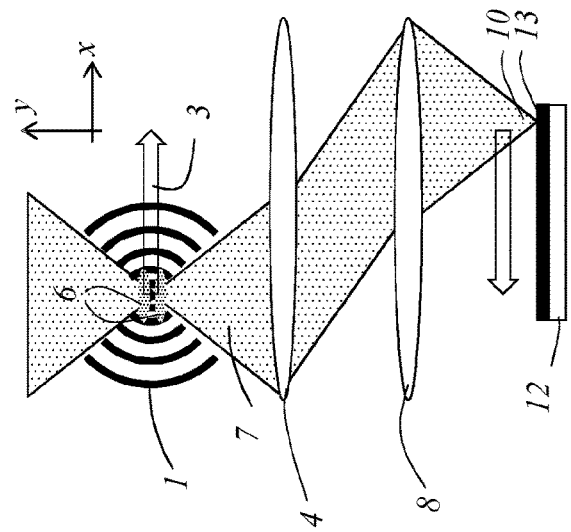
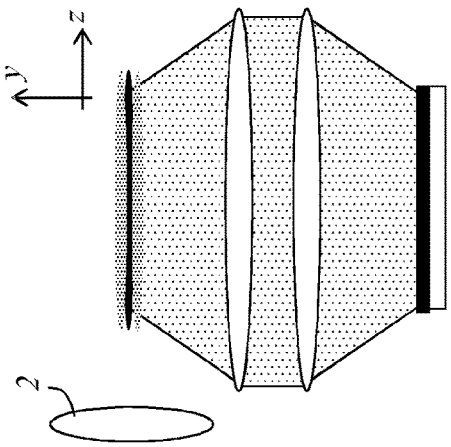
Fig. 14  Fig. 15
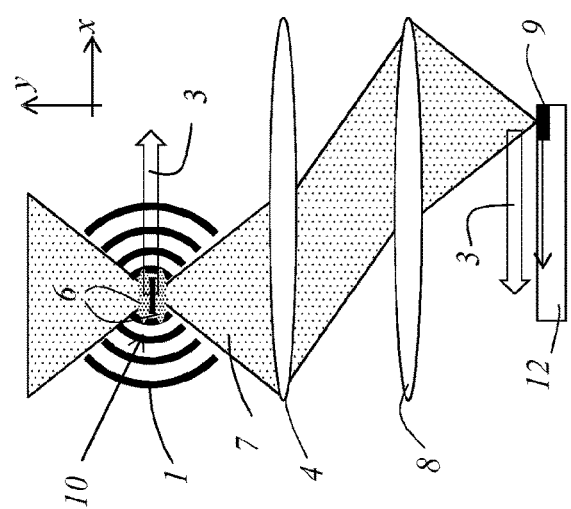
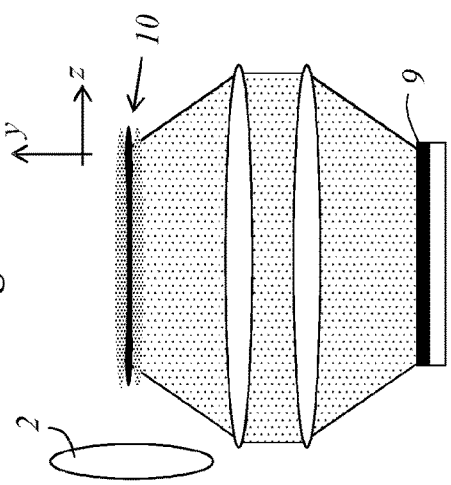
Fig. 16  Fig. 17
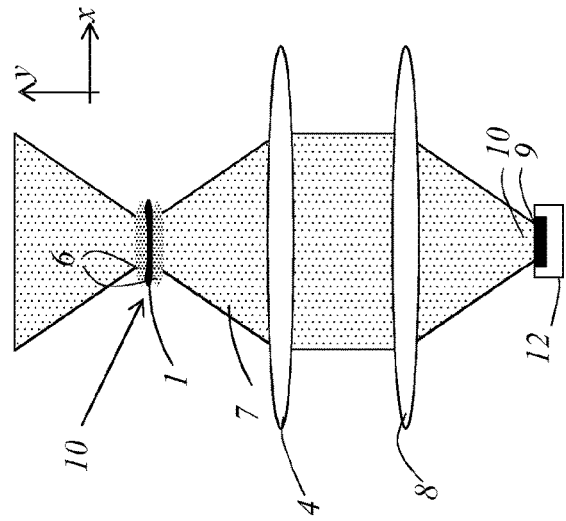
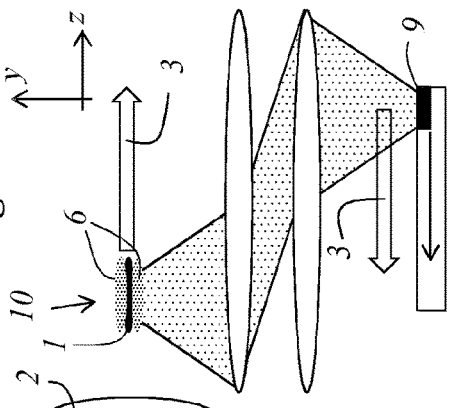
Fig. 18  Fig. 19

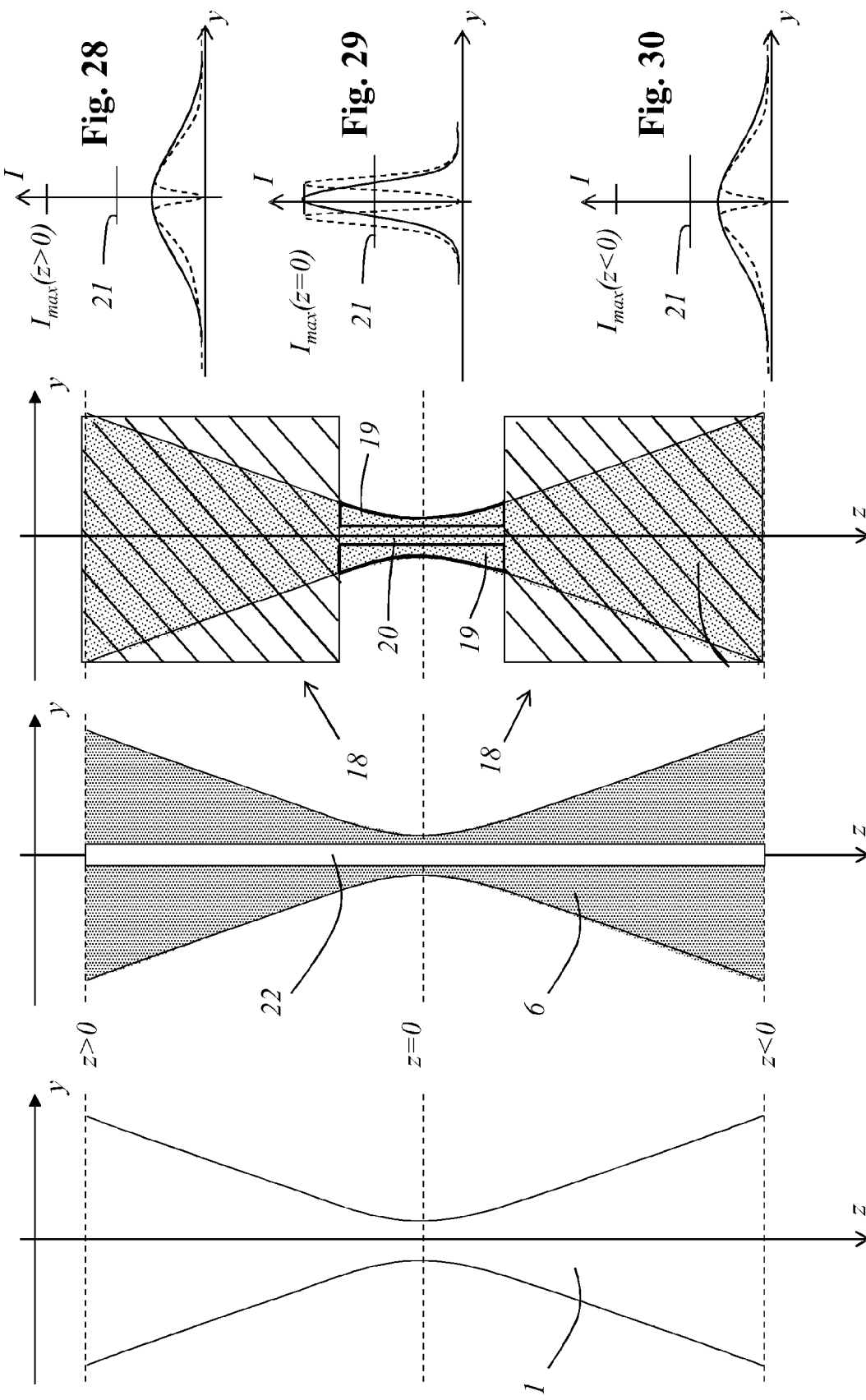

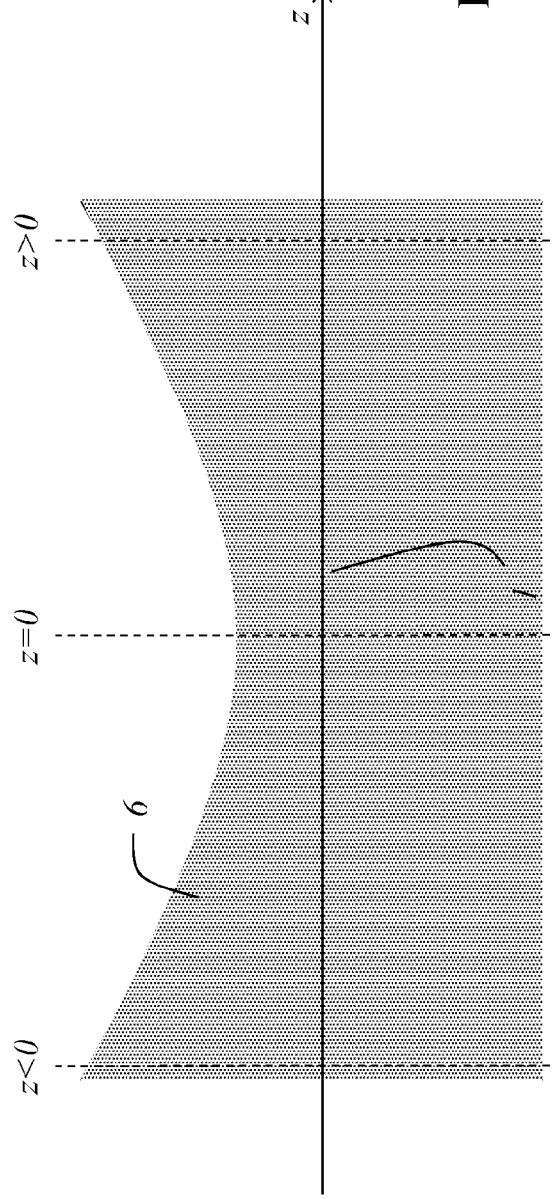
Fig. 31
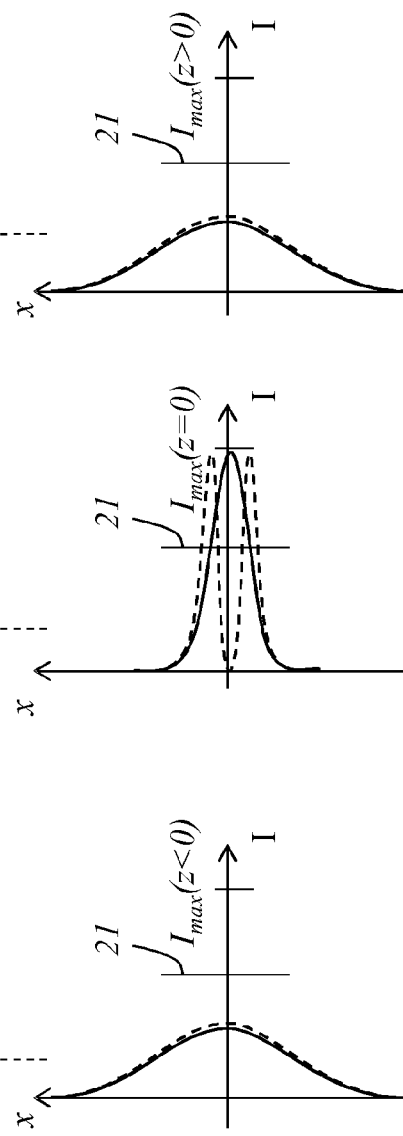
Fig. 34
Fig. 33
Fig. 32

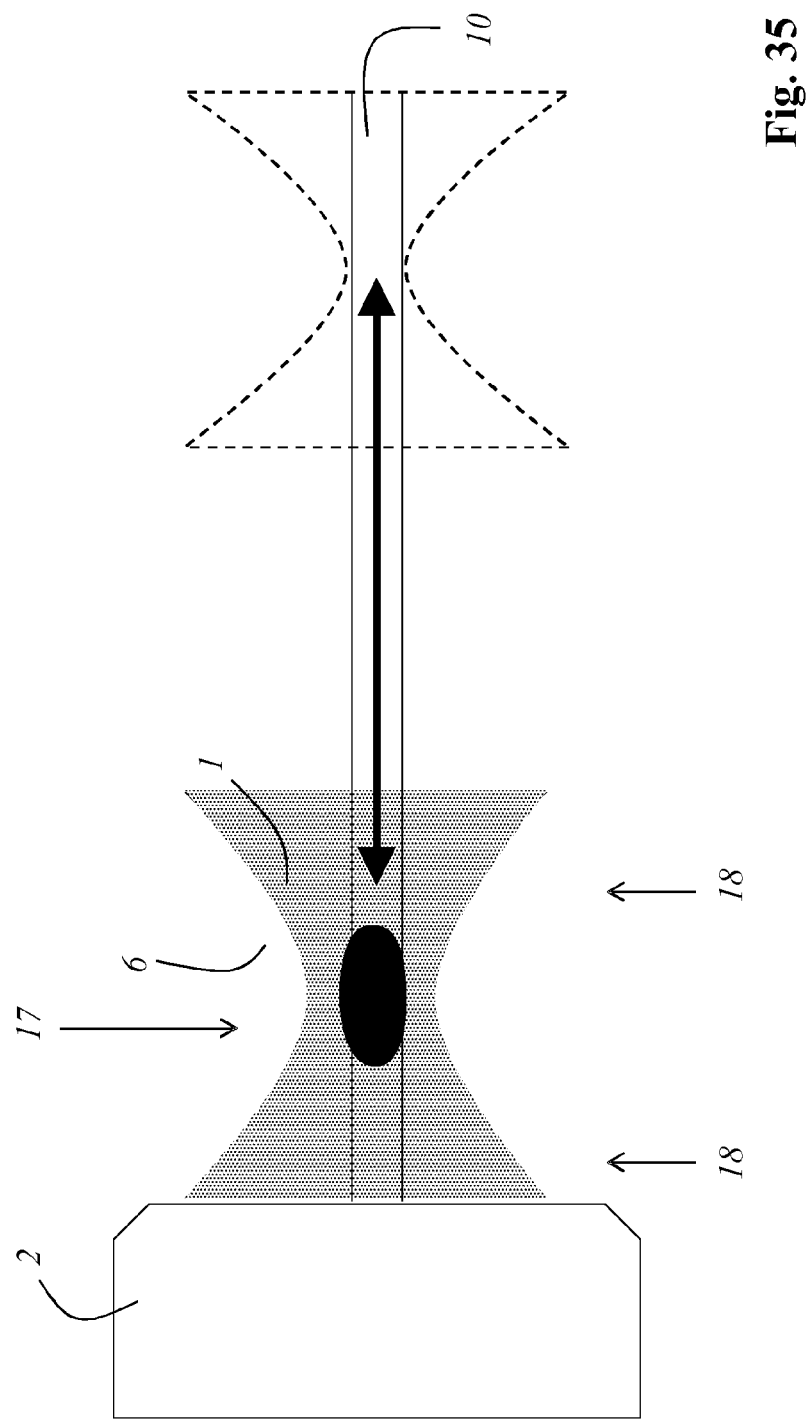

METHOD FOR EXAMINING A SAMPLE, AND DEVICE FOR CARRYING OUT SUCH A METHOD

CROSS-REFERENCE TO PRIOR APPLICATIONS

This application is a division of U.S. application Ser. No. 16/315,175, filed Jan. 4, 2019, which is a U.S. National Stage Application under 35 U.S.C. § 371 of International Application No. PCT/EP2017/066833 filed on Jul. 5, 2017, and claims benefit to Luxembourgian Patent Application No. LU 93143, filed on Jul. 6, 2016, the entire disclosures of which applications are hereby incorporated by reference herein. The International Application was published in German on Jan. 11, 2018, as WO 2018/007469 A2 under PCT Article 21(2).

FIELD

The invention relates to methods for examining a sample and to a device for carrying out such a method.

The invention also relates to a device which is designed to examine a sample and which comprises at least one light source for generating an illuminating light beam having at least one suitable wavelength for fluorescence excitation of the sample, and for generating a depletion or switching light beam, which includes at least one suitable wavelength for the depletion of the sample and which includes at least one illumination objective for focusing the illuminating light beam and the depletion or switching light beam.

BACKGROUND

SPIM (single plane illumination microscopy) technology, wherein illumination of the sample takes place in layers allows faster and more sample-sparing acquisition of image data than, for example, in a point-by-point scanning of a sample. One known field of application of SPIM technology is the field of fluorescence microscopy, wherein fluorophores in the sample are excited with laser light. In the case of SPIM technology, excitation only takes place in only one of an illumination light sheet (also called "light strip"). Damage to the sample by illumination light in other planes is thereby avoided.

An optical device operating according to the SPIM method is described in DE 102 57 423 A1. In this microscope, a sample is illuminated with a thin light sheet, while observation takes place from a direction perpendicular to the plane of the illuminating light sheet. Here, the illumination and the detection are made via two separate optical beam paths, each with separate optics. The light sheet is produced by a cylindrical lens. For image acquisition, the sample is moved through the light sheet which is fixed with respect to the detector to record in layers fluorescence and/or scattered light with a plane detector. The layer image data thus obtained can subsequently be combined to form a data set corresponding to a three-dimensional image of the sample.

From DE 10 2010 060 121 A1, a SPIM microscope is known which is provided with a y-directional illumination source and a z-directional detection light camera. An x-scanner generates a sequential light sheet by scanning the illuminating light beam in the x-direction. The focal length of the illuminating light beam can be varied by means of an illumination optical system with a zoom lens arranged in the beam path of the illuminating light beam. According to one embodiment, optionally a STED (Stimulated Emission Depletion) beam may be switched on, for which purpose a depletion light source is provided which transmits a depletion light beam from the y-direction onto the object to be imaged which thins out the sequentially generated light sheet in the z-direction whereby the depletion light beam which is laterally offset to the illuminating light beam in the z-direction is transmitted to the object and is scanned parallel to the illuminating light beam in the x-direction. Preferably, there is a depletion beam, which has been changed in its cross section so that it has 2 maxima, which has a zero point in front of and behind the center of the excitation beam seen in the z-direction. However, it is also possible to provide two separate laser beams as depletion beams, or to thin the light sheet on one side only, i.e. seen in the z-direction only to apply either before or behind the excitation beam a depletion beam.

From DE 10 2009 044 983 A1 a microscope is known, which has an illumination device with which a light sheet for illuminating a sample area is generated, which extends in the direction of an illumination axis of an illumination beam path and is in the direction of a transverse axis, which is transverse to the illumination axis, approximately plane. The microscope further comprises a detection device for detecting light emitted along a detection axis of a detection beam path from the sample area, whereby the illumination axis and detection axis as well as the transverse axis and detection axis being at a non-zero angle to each other, and further the detection device includes a detection lens in the detection beam path. In such a microscope, the detection device also comprises a detection element from a front lens of the detection lens spatially separated and from this independently optically adjustable by means of which the size of a detection image field is continuously variable, and/or by means of a detection focus plane in the sample area is continuously movable.

From Dean, K. & Fiolka, R., "Uniform and scalable light-sheets generated by extended focusing", Opt. Express 22, 26141-26152 (2014), a system is known in which a thin, short illumination beam with a fast-tunable lens is pushed back and forth along the optical axis. Due to the lower depth of field of the beam this can be thinner, which is supposed to increase the image contrast. However, since the out-of-focus region of the beam also excites fluorescence, a slit aperture is used to achieve the desired effect. This slit aperture runs collinear with the illumination beam in a conjugate plane in the detection beam path. Despite the use of the slit aperture, the increase in the image contrast is relatively small, in particular because a large amount of fluorescent light is detected that was not excited by the focus of the illumination beam.

From Zong, W. et al. "Large-field high-resolution two-photon digital scanned light-sheet microscopy" Cell Res. (2014), a similar microscope is known, but there is a non-linear fluorescence excitation. Also, in CN 104407436 such a microscope is described.

In Gao, L., "Extend the field of view of selective plan illumination microscopy by tiling the excitation light sheet", Opt. Express, 23, 6102-6111 (2015) discloses shifting the light sheet generated by a scanned illumination beam in several, discrete steps along the illumination axis and then joining together the images obtained for each step. This method has the disadvantage that it takes a long time to take several frames one after the other. Furthermore, the effective thickness of the illuminated area is not uniform across the field of view along the propagation direction of the illumination beam. The illumination beam is always thinner in the middle of the individual images than at the edge. The image composed of individual images thus consists alternately of areas which were illuminated with a thinner and thicker light beam, i.e. with higher and lower contrast.

From Fahrbach, F. O., Voigt, F. F., Schmid, B., Heimchen, F. & Huisken, J. Rapid 3D light-sheet microscopy with a tunable lens. Opt. Express 21, 21010 (2013), it is known for fast imaging of volumes to rapidly move a light sheet along the detection axis and track the focal plane of the detection optics with a tunable lens.

DE 10 2007 063 274 A1 discloses a microscope comprising an imaging objective for imaging a sample on a detector and means for illuminating the sample with a light sheet in the focal plane of the imaging objective, which contains a coherent light-emitting illumination source. In this microscope, the means for illumination comprise Bessel optics, which generate from the light beam at least two plane waves and provide propagation directions to the plane waves, whereby the propagation direction of each of the plane waves includes an acute angle with each of the focal planes, the amount for each of the plane waves is the same, so that the plane waves in the focal plane constructively interfere, whereby a light sheet is generated. Similarly, the means for illumination may also comprise an optical element with which a rotationally symmetric Bessel beam is generated from the light beam for the dynamic generation of a light sheet.

From DE 10 2008 009 216 A1 an apparatus and a method for spatially high-resolution imaging of a structure of a sample is known. The device has a diffraction-limited resolution volume with several different states of dye molecules which can be switched between, wherein at least one state is fluorescent. The fluorescent light is collected with an objective and imaged with an optical system on a spatially resolving detector, wherein the dye molecules in at least a part of the sample have a distribution density which is greater than the inverse of the diffraction-limited resolution volume. The device also includes one or more light sources for emitting a switching radiation to switch a first subset of the dye molecules in the sample, and for emitting an excitation radiation to excite the first subset of the dye molecules. At least one of the light sources is arranged in such a way that it radiates through the sample and a switching and/or fluorescence excitation of the dye molecules takes place in the sample at least in one direction approximately perpendicular to the optical axis and in particular in the focus of the objective, wherein advantageously the switching is photo-activation or deactivation of the dye molecules and the light source for switching and/or the light source for excitation, is a focusing arrangement for generating an extended, at least in one direction, at least approximately perpendicular to the optical axis of the lens, linearly extended illumination region in the direction of illumination.

From DE 10 2009 008 646 A1 a method is known for detecting a chromophore on an area in a sample, in particular for imaging a concentration of the chromophore on the area in the sample. It is provided here that at least the area in the sample is irradiated with light having a first photo energy which corresponds to a first transition of the chromophore to a first state. At least an area in the vicinity of the area in the sample is irradiated with light having a second photo energy corresponding to a second transition of the chromophore to a second state, whereby the intensity of the second photo energy light in the area has a minimum. A subset of the chromophore that is in the first state after irradiating the sample with first photo energy light and second photo energy light is detected to detect the chromophore in the surface. The imaging optics are arranged in particular perpendicular or substantially perpendicular to the surface.

From EP 2 444 832 A1 a SPIM microscope is known which is provided with a y-directional illumination source and a z-directional detection light camera. An x-scanner generates a sequential light sheet by scanning the illuminating light beam in the x-direction. By selective addition of a STED depletion beam the light sheet can optionally thin and thus increase the optical resolution. "Tunable Acoustic Gradient Index of Refraction Lenses", in short TAG lenses, can be used which provide a variable way to modulate the excitation beam. Such TAG lenses represent an alternative method of creating a Bessel beam. In such TAG lenses, a refractive liquid is contained within a circular piezoelectric element and is excited by an AC signal to produce an alternating refractive index in the liquid. Changes in the amplitude in the frequency of the excitation signal allow a rapid change of the transmitted pattern. According to a further preferred embodiment of the invention, a phase plate is provided which modulates the depletion light beam. The depletion beam can be modulated so that the excitation is only narrowed laterally to obtain a thinner light sheet. For this purpose, one single phase plate is sufficient. However, it is alternatively also possible to limit the respective excitation point on all sides.

DE 20 2011 110 077 U1 discloses an arrangement for illuminating a sample in SPIM microscopy. The arrangement has a light source for generating a light beam, means for producing a light strip from the light beam, in particular for substantially planar illumination of a sample in an illumination plane from at least one direction, at least one objective having an optical system which is designed and intended for this purpose directly or indirectly supplying detection light emanating from the sample to a detector, whereby the optics of the objective interacts with the light strip, and a deflecting device downstream of the optics of the objective for deflecting the light strip, whereby the strip of light after deflection is arranged to illuminate a sample in a non-zero angle, in particular a right angle, to the optical axis of the objective and/or is arranged in a non-parallel plane in an optical axis of the objective.

SUMMARY

In an embodiment, the present invention provides a method for the examination of a sample. The sample is illuminated in a sample plane along a sample line with an illuminating light beam propagating along the sample line and having at least one wavelength suitable for fluorescence excitation of the sample. The sample is acted upon by a depletion or switching light beam, which overlaps in the sample plane in an overlap region at least partially spatially with the illuminating light beam and which has at least one wavelength suitable for depletion of the sample. Part of fluorescent light emanating from the sample plane is detected as detection light originating from a first subregion of the overlap region, in which the probability of an interaction of the sample molecules with the depletion or switching light beam is greater than 90%, and/or originating from a second subregion which is at least partially surrounded by the first sub-region and/or in which the depletion or switching light beam has a zero point, while at the same time the fluorescent light originating from outside the first subregion and the second subregion is at least partially suppressed and not detected.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIGS. 14 and 15 show a schematic illustration of a conventional detection in SPIM, wherein, however, an illuminating light beam in the form of a sectioned Bessel beam is advantageously used for illumination, FIGS. 16 and 17 show a schematic example illustrating a confocal line detection in SPIM, as it can be used in carrying out a method according to the invention, FIGS. 18 and 19 show a further schematic example illustrating a detection in SPIM, as it can be used in carrying out a method according to the invention.

FIGS. 25, 26 and 27 show a schematic representation of the intensity distributions of the excitation light and the depletion or switching light and the resulting fluorescence in a cross section along the light propagation direction to explain an embodiment of the invention, FIG. 28 shows a schematic representation of the intensity distributions of the excitation light and the depletion or switching light in a cross section perpendicular to the light propagation direction in front of the focus, FIG. 29 shows a schematic representation of the intensity distributions of the excitation light and the depletion or switching light in a cross section perpendicular to the light propagation direction in the focus, FIG. 30 shows a schematic representation of the intensity distributions of the excitation light and the depletion or switching light in a cross section perpendicular to the light propagation direction behind the focus, FIG. 31 shows a schematic representation of a transverse cross section of the superposition of an illuminating light beam with a depletion or switching light beam according to the prior art (STED-SPIM), FIG. 32 shows a schematic representation of the STED efficiency at different positions, namely in front of the location of the minimum beam radius ($z<0$).

FIG. 33 shows an illustration of the intensity distribution of illuminating light beams and depletion or switching light beams at the location of the minimum beam radius ($z=0$), FIG. 34 shows an illustration of the intensity distribution of illuminating light beams and depletion or switching light beams after the location of the minimum beam radius ($z>0$), FIG. 35 shows a schematic illustration of the illumination in an example of an embodiment according to the invention.

DETAILED DESCRIPTION

Figure 1:
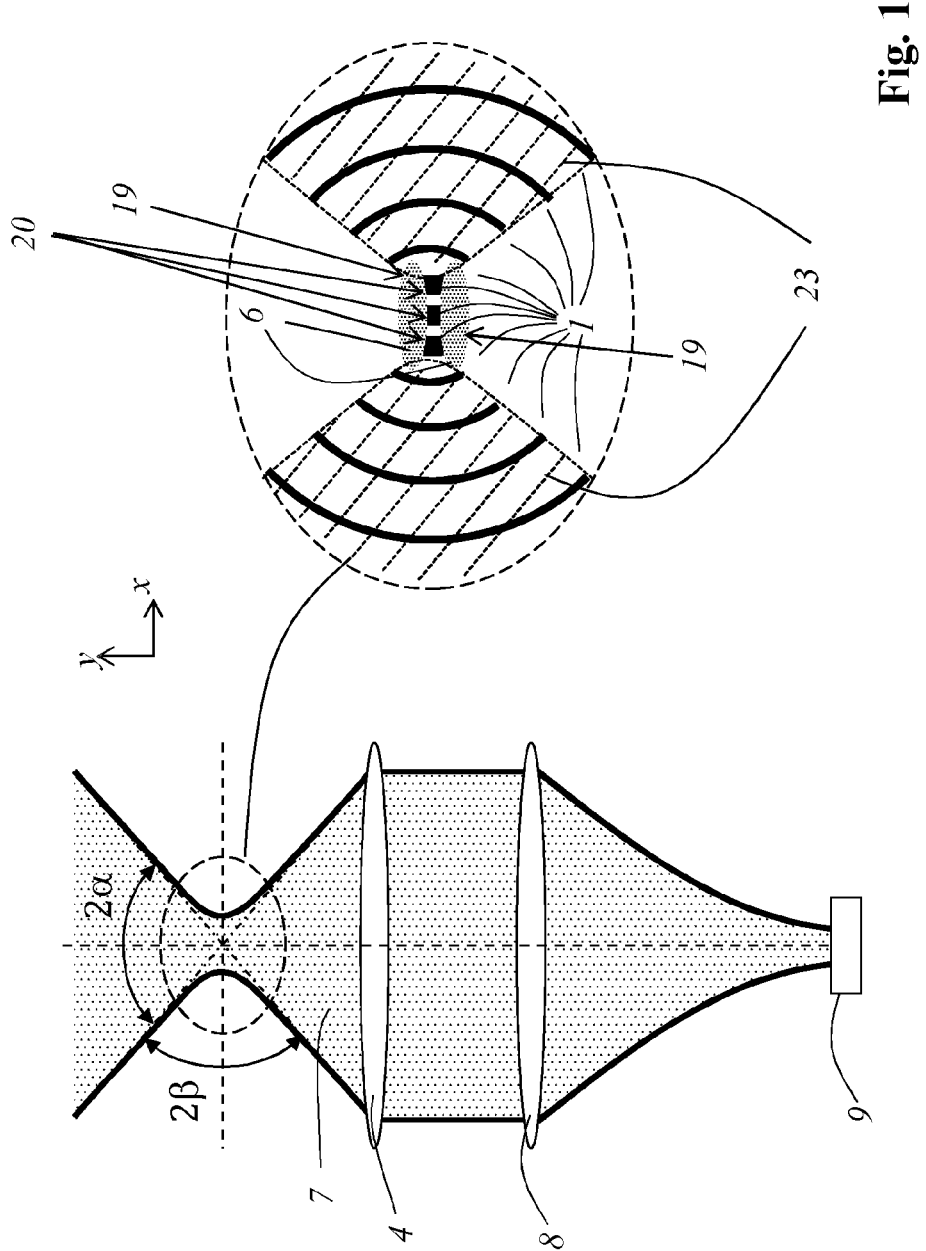
FIG. 1 shows a schematic representation of an exemplary embodiment of the method according to the invention with reference to a detailed view of an exemplary embodiment of a device according to the invention.

In an embodiment, the present invention provides a method which enables the generation of a high-contrast image of a thin layer of a sample.

An embodiment of the method is characterized in that:
a. the sample is illuminated in a sample plane along a sample line with an illuminating light beam propagating along the sample line and having at least one wavelength suitable for fluorescence excitation of the sample, and that
b. the sample is acted upon by a depletion or switching light beam, which overlaps in the sample plane in an overlap region at least partially spatially with the illuminating light beam and which has at least one wavelength suitable for depletion of the sample, and c. the part of the fluorescence light emanating from the sample plane is detected as detection light originating from a first subregion of the overlap region, in which the probability of an interaction of the sample molecules with the depletion or switching light beam is greater than 90%, in particular greater than 95%, very particularly greater than 99%, and/or originating from a second subregion which is at least partially surrounded by the first sub-region and/or in which the depletion or switching light beam has a zero point, while at the same time the fluorescent light originating from outside the first subregion and the second subregion is at least partially suppressed and not detected.

In another embodiment, the present invention provides a device for the examining of a sample which enables the production of a high contrast image of a thin layer of a sample.

An embodiment of the device, which is of the aforementioned type, is characterized in that the illuminating light beam and the depletion or switching light beam are guided such that a sample to be examined is illuminated in a sample plane along a sample line with the illuminating light beam propagating along the sample line and the depletion or switching light beam in the sample plane overlaps at least partially spatially with the illuminating light beam, and that there is detection optics, which includes a detection objective, and which images the detection light emanating from the sample area illuminated by the illuminating light beam along the sample line to a detection plane, in which a detector is arranged which detects the portion of the fluorescence emitted by the sample plane as a detection light originating from a first subregion of the overlap region in which the probability of an interaction of the sample molecules with the depletion or switching light beam is greater than 90%, in particular greater than 95%, very particularly greater than 99%, and/or originates from a second subregion, which is surrounded by the first subregion at least in sections and/or in the depletion or switching light beam has a zero point, while the detector simultaneously at least partially suppresses and does not detect the fluorescent light originating from outside the first subregion and the second subregion. In particular, the second subregion could be the region including and around the zero point of the depletion beam, in which the interaction probability of a molecule with the switching light beam is less than 10%, 5%, 1%. A sample line in the sense of the present invention is to be understood as meaning also, in particular, a sample strip which may have a predeterminable extent transverse to its longitudinal direction.

In accordance with the invention, it has also been recognized that effective suppression of fluorescence by means of STED requires an extremely high intensity of the light power of the depletion light beam, so that depletion must be concentrated to a spatially narrow region. In particular, it is not possible or even sensible to achieve the light power densities required for a sufficiently probable interaction of the depletion or switching light beam with the sample molecules in the entire wider environment of the sample region from which fluorescent light is to be detected. If this is not taken into account, only a very slight improvement in resolution and/or damage to the sample will be achieved by means of the depletion light beam. It was further recognized that therefore disturbing fluorescent light arises in this wider environment and reaches the detector, which in the result adversely affects the contrast of the image. Embodiments of the present invention successfully avoid this.

In particular, it has been recognized in the present invention that efficient depletion of the ring structure in STED-SPIM application using Bessel beams cannot be realized. The suppression of fluorescence by means of long, weakly focused Gaussian beams is not very effective due to the low intensity. This low efficiency is contrasted with a not inconsiderable burden on the sample by exposure to the depletion light and the associated phototoxic effects.

It is usually so that only the fluorescent light is to be detected which comes from the area in which the depletion and/or switching light beam has a zero point. Here, the second subregion is defined as including the area in which the depletion or switching light beam has a zero point caused by diffraction and/or interference, wherein in the sense of the present invention, in particular, there is also a zero point when the light power due to technical imperfections or scattering in the sample is not exactly zero. In particular, the invention is based on the idea of minimizing the number of fluorophores to be depleted. It is detected in particular by the lateral and/or axial suppression of fluorescent light originating from outside of the first and second subregion, so that only ever detection light from the currently interesting area, such as a narrow strip in the object along the illuminating light beam is detected, which increases in particular image contrast. The second subregion may be surrounded in sections or also all around and/or completely surrounded by the first subregion in the sample plane to be examined.

A particularly efficient possibility of combining STED/RESOLFT with SPIM in such a way that the depletion or switching light beam has to have a comparatively low power, is to use an illuminating light beam that illuminates this narrow area/strip parallel to the illumination axis and in the illumination plane (light sheet plane) from the side so that the overlap between excitation and detection PSF is minimized. As will be described in detail below, the illumination can advantageously be carried out laterally (in particular along the scan direction) by so-called sectioned Bessel beams. A key advantage of such a combination is that the depletion or switching light beam only has to be used to deplete a very small portion of the molecules, since the overlap of detection and excitation PSFs is very small. The few molecules to be depleted are advantageously further away from the nominal focal plane of the detection objective than the desired axial resolution.

An embodiment of the invention advantageously leads to the fact that a detection of fluorescent light, which originates from regions too far away from the focal plane of the detection objective, is largely suppressed by masking. This can be done laterally or axially, as explained in more detail below. In addition, the illumination is preferably chosen so that the overlap of detection PSF and illumination PSF is kept as small as possible, for example by illuminating a confocal detected line from the side and/or aligning the optical axis of the detection lens perpendicular to the sample plane. In addition, the fluorescent molecules in the overlap area and outside the illumination PSF and detection PSF are depleted in the areas away from the focal planes of the detection objective by the depletion or switching light beam, which further improves the optical sectioning and resolving power.

The illuminating light beam can be designed in particular as a Gaussian beam or as a Bessel beam or as a sectioned Bessel beam or as a Mathieu beam. In a particular embodiment, it comprises at least one light source a light influencing means which generates a Bessel beam or a sectioned Bessel beam or a Mathieu beam from a primary illumination beam, which may be, for example, a Gaussian beam emitted by a laser. For this purpose, the light influencing means may include, for example, an SLM (spatial light modulator) or a combination of an axicon and a slit aperture.

The background of illumination using Bessel beams or sectioned Bessel beams is as follows:

Focusing the light passing through a ring aperture causes intensity maxima along the optical axis in the region of the focus due to constructive interference. In the longitudinal cross section, the area of interference of the plane waves, which run from different directions but at substantially the same angle with respect to the optical axis, is substantially diamond-shaped. A disturbance in a small area of the ring-shaped illuminating light beam has almost no effect in the area of the focus on the optical axis, because all the illumination light there interferes. Suppression in a small area outside the optical axis has thus almost no influence on the constructive interference. In the areas of focus with an axial distance to the optical axis, a disturbance in the area of the incident light is "healed" in that the remaining light behind the disturbance covers a shadow cast by the disturbance.

A Bessel beam generated with an ring-shaped illumination of the pupil is rotationally symmetrical with respect to the optical axis. In addition, such a Bessel beam has intensity maxima in the form of concentric rings in a cross section perpendicular to the optical axis, wherein the greatest intensity maximum is located on the optical axis.

If one now suppresses segments of the annular illumination light, in particular symmetrically, one shall speak of a "sectioned Bessel beam". For example, one could use a ring aperture, in which additionally two mutually mirror-symmetrically opposite circumferential regions are covered, or a ring aperture in combination with a slit aperture. The light then passes only through the two intermediate circumferential regions of the ring aperture. The focus of such a "sectioned Bessel beam" is not rotationally symmetric in cross section perpendicular to the optical axis. Rather, in such a "sectioned Bessel beam" parts of the originally ring-shaped intensity maxima are suppressed, so that adjacent, to the optical axis concavely oriented curved intensity maxima, namely ring segments referred to as "section rings".

Preferably, at least part of the sample plane is scanned successively by moving the overlapping area. In particular, it can advantageously be provided that at least a part of the sample plane is successively scanned by moving the overlapping area by moving a focus of the illuminating light beam in the sample plane, wherein a focus of the depletion or switching light beam is moved synchronously with the focus of the illuminating light beam.

For example, at least a part of the sample plane can be scanned successively by moving a focus, in particular a comparatively short focus, of the illuminating light beam together with the focus of the depletion or switching light beam in the light propagation direction, i.e. along the sample line. Here, a short focus is to be understood as meaning that the focus is so strong that the depth of field of the beam achieved thereby does not correspond to the length of the entire strip to be imaged along the sample line and/or that the extent of the focus along the detection axis is less than it would be for a beam, the depth of field of which corresponding to the extent of the imaged strip along the direction of illumination. As soon as the part of the sample plane to be examined has been traversed in this way, the process can be repeated continuously along the respectively adjacent sample line until the part of the sample plane to be examined has been scanned in two dimensions. In particular, in this embodiment, the detector may be formed as a slit detector, wherein the slit width direction is aligned parallel to the longitudinal extension direction of the image of the sample line in the detection plane. In this way, an axial suppression of the unwanted fluorescent light is achieved.

According to another example, at least a part of the sample plane can be scanned successively by moving a focus, in particular comparatively long focus, of the illuminating light beam together with the focus of depletion or switching light beam perpendicular to the light propagation direction, i.e. perpendicular to the sample line, until the part of the sample plane to be examined is scanned in two dimensions. In particular, in this embodiment, the detector may be formed as a slit detector, wherein the slit width direction is aligned perpendicular to the longitudinal extension direction of the image of the sample line in the detection plane. In this way, a lateral suppression of the unwanted fluorescent light is achieved.

In a particular embodiment of the method according to the invention, the depletion or switching light beam has the same propagation direction as the illuminating light beam. However, it is also possible for the illuminating light beam and the depletion or switching light beam to have opposite propagation directions. In that regard, it may be advantageously provided in general terms that the depletion or switching light beam has a direction of propagation parallel to the propagation direction of the illuminating light beam.

Particularly good results can be achieved by means of an embodiment in which the depletion or switching light beam has a circular-symmetrical cross sectional profile or in which the depletion or switching light beam in cross section has two maxima which are arranged symmetrically about a zero point. In particular, it is in any case advantageous if the depletion or switching light beam has a central zero point.

The depletion or switching light beam may advantageously be formed, for example, from at least one Laguerre-Gaussian or Laguerre-Bessel beam.

As already mentioned, in a particularly advantageous embodiment at least one planar part of the sample plane is scanned successively, sample line for sample line, by moving the illuminating light beam in the sample plane, in particular perpendicular to its propagation direction. The depletion or switching light beam is hereby moved synchronously with the illuminating light beam. In order to examine the entire image field successively, the illuminating light beam can be moved together and synchronously with the depletion or switching light beam during the detection in the sample plane, in particular perpendicular to the propagation direction of the illuminating light beam. In particular, the illuminating light beam may be moved continuously back and forth together and synchronously with the depletion or switching light beam during detection in the illumination plane perpendicular to the propagation direction of the illuminating light beam.

In particular for this purpose, in the device according to an embodiment of the invention, at least one illumination beam deflection device which is adjustable with respect to the deflection angle may be arranged in the beam path of the illuminating light beam, by means of which the illuminating light beam can be displaced relative to the sample in the sample plane, in particular perpendicular to its propagation direction. In this case, it can also be provided, in particular, that the illumination beam deflection device also deflects the depletion or switching light beam, whereby a synchronous deflection of the illuminating light beam and the depletion or switching light beam is achieved in a simple manner.

Alternatively, however, it is also possible that there is a further illumination beam deflection device which deflects the depletion or switching light beam synchronously with the movement of the illuminating light beam.

A particularly high resolution can be achieved in an embodiment of the method according to the invention, in which the position of the illuminating light beam is in addition to the movement modulated in a high-frequency with a small-amplitude manner for a successive scanning of the sample plane. Specifically, for example, it may be provided that the position of the illuminating light beam is modulated in addition to the movement necessary for a successive scanning of the sample plane at a frequency which is greater than three times $t_{exp}$, where $t_{exp}$ is the exposure time of the detector. Advantageously, the amplitude of the modulation can be chosen such that it corresponds in the sample volume at least $\lambda/NA$, in particular $3\lambda/NA$, where $\lambda$ is the wavelength of the illumination light and NA is the numerical aperture under which the illuminating light beam (1) is focused. In the case of asymmetrical focusing, the amplitude can be selected advantageously such that it corresponds in the sample volume to at least $\lambda/NA_x$, in particular $3\lambda/NA_x$, where $Na_x$ is the amount of NA along the scan axis.

For this purpose, a modulator may be present, which is formed, for example, in such a way that a modulation signal is additionally superimposed on an electrical drive signal for the illumination beam deflection device, so that the illumination beam deflection device, in addition to a successive movement of the illuminating light beam and the depletion or switching light beam, also causes a high-frequency position modulation.

The device according to the invention may advantageously have a, in particular electronic and/or computer-based, control device with which the position of the detector, in particular a slit detector, in the detection plane and the position of the illuminating light beam and the depletion and switching light beam in the illumination plane and optionally the above-mentioned additional modulation of the position of the illuminating light beam is controlled.

The detection light is detected to realize a confocal line detection using a slit detector, wherein the slit width direction of the slit detector is preferably aligned perpendicular to the longitudinal direction of the image of the illumination strip in the detection plane. The slit detector can be designed in very different ways. Some embodiments of slit detectors which are particularly advantageous for carrying out the method according to the invention are described below.

For example, the slit detector may be part of an area detector. In a particularly advantageous embodiment, the slit detector is formed by the respectively switched active part of an area detector arranged in the detection plane. The area detector may be, for example, a CMOS detector or sCMOS detector.

For example, it is advantageously possible to read only a part of the area detector, namely the part which currently corresponds to the slit detector (switched active part), while the remaining parts of the area detector, namely the parts which lie outside the slit detector, are not read out (switched inactive part).

In such an embodiment, mechanical components, such as a mechanical slit aperture, are avoided, which is particularly advantageous when it comes to move the slit detector, in particular synchronously to a movement of the illuminating light beam and the depletion or switching light beam and/or to a movement of the focus of the illuminating light beam and the focus of the depletion or switching light beam in the detection plane. In such an embodiment, namely, the area detector can remain stationary, in particular relative to the detection objective and/or the illumination objective and/or the sample and/or relative to the incident detection light, wherein sequentially in time different parts of the sensor surface of the area detector, which then each form the slit detector, are switched to be active in such a way that in each case only the detection light falling on the switched active part is detected, while detection light falling on the respectively switched inactive parts of the area detector is not detected.

In particular, it can be advantageously provided that the active switching takes place continuously, so that in each case a range of pixels switched active pass along the sensor simply uniformly and synchronously to a movement of the illuminating light beam and the depletion or switching light beam. The result is a spatially uninterrupted movement of the slit detector, without the need for mechanical components to be moved. In that regard, such a design has the particular advantage of a long life, because a movement-related wear, for example, of mechanical apertures is avoided.

In another, alternative embodiment, the slit detector has an area detector arranged in the detection plane, for example a CMOS detector or an sCMOS detector, which is preceded by a slit aperture, in particular mechanical slit aperture, wherein the area detector is preferably always switched active with respect to its entire sensor surface. In particular, to be able to move the slit detector, this slit aperture can be embodied, for example, by a mechanical shutter curtain, as is used in mirror reflex cameras. In this embodiment, the area detector can be active with respect to its entire sensor area, in particular also while the slit aperture and/or the illuminating light beam and/or the focus of the illuminating light beam are moved.

Also, in an embodiment of the slit detector with a slit aperture, it can be provided that the slit detector is moved in the detection plane relative to the incident detection light, in particular in the slit width direction or perpendicular to the slit width direction, in particular by moving the slit aperture.

The slit aperture can also be designed to be particularly advantageous as a non-mechanical component. For example, as a sectionally switchable mirror/absorber e.g. based on liquid crystals. Such an embodiment can be combined with spectral filters particularly advantageously. The slit aperture can advantageously be moved, for example, by successive translucent switching and opaque switching of respectively adjacent parts of the SLM (spatial light modulator), as a result of which a moving aperture, in particular continuously moving aperture, is achieved.

As already mentioned, it can be advantageously provided that the illuminating light beam is moved together and synchronously with the depletion or switching light beam during the detection in the illumination plane relative to the sample. For this purpose, for example, a detection beam deflector adjustable with respect to the deflection angle can be used. Such a detection beam deflection device may, for example, have at least one galvanometer mirror. In a device which is constructed on the basis of a scanning microscope, for example, the already existing beam deflection device of the scanning microscope, in particular a confocal scanning microscope, can be used; this in particular also if the device according to the invention is made by conversion of a scanning microscope or method of the invention is carried out using a scanning microscope.

In an alternative embodiment, the detection light is deflected to a slit detector fixed relative to the sample and/or relative to a detection objective by means of a detection beam deflection device which is arranged in the detection beam path and can be adjusted with respect to the deflection angle and which is controlled synchronously with a movement of the illuminating light beam. This corresponds to a slit detector with a de-scanning mirror, that is to say a scanning mirror arranged in the detection beam path, which is synchronized with the scanning mirror in the illumination beam path such that the illuminated line is imaged onto a stationary line sensor. In this case, however, the structure can also be realized in such a way that one and the same mirror is used for both illumination and detection light, as a result of which the synchronization is advantageously eliminated. The line sensor can also comprise several pixel lines, in which case a step-by-step scanning of the sample must take place.

In a very particularly advantageous embodiment, the focus of the illuminating light beam and/or the focus of the depletion or switching light beam are moved parallel to the propagation direction of the illuminating light beam and along the sample line during the detection. Such an embodiment makes it possible to scan the sample line successively, in particular continuously, with a spatially very narrow and strongly focused focus of the illuminating light beam, which is overlaid by a correspondingly narrow focus of the depletion or switching light beam, whereby an even further increased resolution can be achieved. Here, a narrow and strongly focused focus is to be understood as meaning that the focusing is so strong that the depth of field of the beam achieved thereby does not correspond to the length of the strip of the sample plane to be imaged and/or that the extent of the focus along the detection axis is less than it would be for a beam whose depth of field corresponds to the extent of the imaged strip along the direction of illumination.

In this case, in order to scan over a planar part of the sample plane, it can be provided that the illuminating light beam in the sample plane is moved successively, in particular perpendicular to its direction of propagation, and so at least a portion of the sample plane is scanned, sample line for sample line, wherein during scanning a sample line, the focus of the illuminating light beam is moved along the respective sample line.

In order to move the focus of the illuminating light beam and/or the focus of the depletion or switching light beam during detection parallel to the propagation direction of the illuminating light beam and along the sample line, different approaches are possible, some of which will be described in detail below by way of example.

For example, a focus moving device may have zoom optics or at least a variable focal length lens that allows the focus of the illumination beam and/or the focus of the depletion or switching light beam to be moved parallel to the propagation direction of the illumination beam and along the sample line during detection. Such a focus moving device has the advantage that the illumination objective can remain stationary relative to the sample, so that influencing of the sample by a relative movement of the illumination objective, in particular when an immersion agent is used, is avoided.

In another embodiment, the focus of the illuminating light beam and/or the focus of the depletion or switching light beam is moved by changing the length of the optical path of the illuminating light beam, namely by changing the geometric length of the light path and/or by changing a refractive index of an optical component arranged in the optical path.

In particular, a focus moving device may be present and configured and arranged to alter the refractive index in a portion of the light path in which the illumination light converges or diverges. It is also possible that a focus moving device may be configured and arranged to alter the geometric light path in a section of the light path in which the illumination light converges or diverges.

For this purpose, a focus shifting device can in particular be connected behind the illumination objective and/or arranged spatially between the illumination objective and the sample. Such an embodiment does not rely on the installation space within a microscope stand, but advantageously uses the free space in front of the illumination objective and thus the large working distance of the illumination objectives usually used in light-sheet microscopy. In particular, the ring of blocks or the annular element described below can be arranged advantageously and space-saving coaxially with the illumination objective, in particular in front of the front lens of the illumination objective.

A change in the length of the light path can be achieved, for example, by means of an active mirror, which can be moved, for example, by a piezoelectric element. Alternatively, or additionally, the use of an acousto-optical element is possible. As a further alternative, it is also possible to change the light path, optionally by the introduction of different optical elements with different thickness and/or different optical density in the beam path. It is also possible to use spatial light modulators (SLM) or digital mirror devices (DMD) or deformable mirrors (DM) to change the light path.

In a particular embodiment, for changing the optical length of the light path of the illumination light, in particular by motor control, successive transparent blocks of different thickness and/or with different refractive index are introduced into the light path. This can be done, for example, in such a way that a block already introduced for a first movement of the light-sheet focus remains in the beam path and that, for further movement, a further block is additionally introduced into the beam path.

Alternatively, it is also possible, in particular, to realize a stepwise movement of the illuminating light beam and/or of the focus of the depletion or switching light beam in the axial direction by, successively and in exchange for one another, introducing blocks of different thicknesses and/or with different refractive indices into the light path. A special for this purpose predestined focus movement device can have several blocks of different thicknesses and/or with different refractive indices.

Particularly precise and quickly adjustable is an embodiment designed for this purpose, in which the blocks are interconnected forming an arc or a closed ring, wherein the arc or ring for changing the optical length is turned, in particular about the optical axis or about an axis parallel to the optical axis. In this way, namely, each block located in the beam path can be quickly exchanged for another block, wherein the thickness and/or refractive index of the irradiated portion of the ring depends on the respective rotational position of the arc or ring. Preferably, the rotation is controlled by a motor.

The ring of the blocks may advantageously be formed, in particular, as a step ring with a thickness of the blocks increasing along a helical line, which drops steeply from the thickest block to the thinnest block after a 360 degree rotation. With such an embodiment, the focus can be moved relatively slowly in the direction of light propagation or against the direction of light propagation by a rotation of the step ring, in particular a motor-controlled rotation, whereby a quick return follows the slow movement before the slow movement operation repeats.

The blocks may be designed as blocks which can be separated in a non-destructive manner. Particularly robust and easy to handle is an embodiment in which the blocks are different areas of a body manufactured in one-piece.

Alternatively to the above-mentioned embodiments, it may also be provided that an illuminated element is moved by the illuminating light beam and/or the depletion or switching light beam with a thickness, continuously increasing along a path, and/or a continuously increasing refractive index for changing the optical length of the light path relative to the beam path of the illuminating light beam and/or the depletion or switching light beam. The element may in particular be ring-shaped and mounted so that it can be rotated so that the thickness and/or the refractive index of each irradiated area depends on the rotational position of the element. In particular, the element can be mounted so that it can be rotated about the optical axis or about an axis parallel to the optical axis.

In a further alternative, two transparent wedge elements arranged in the beam path of the illuminating light beam and/or the depletion or switching light beam are moved relative to one another, in particular controlled by motor, to change the optical length of the light path. In this case, it can advantageously be provided in particular that one of the wedge elements has an entry surface and the other one of the wedge elements has an exit surface for the illumination light, whereby the entry surface and the exit surface are arranged parallel to one another. The wedge elements can be in contact with each other in a contact plane, in particular via an immersion liquid, such as an oil immersion. Such an embodiment avoids beam offset between the incident and the emergent illumination light.

In a particularly advantageous embodiment, the focus of the illuminating light beam and/or the focus of the depletion or switching light beam are moved by changing the length of the optical light path of the illuminating light beam or the depletion or switching light beam by means of a focus moving device having at least one adjusting arm, the optical length of which is adjustable.

In particular, the focus moving device can have a polarization beam splitter which allows the linearly polarized illuminating light beam coming directly or indirectly from an illumination device to pass into an adjusting arm which is closed by a deflection mirror and in which a tube lens, a λ/4-plate and an objective are arranged. The deflection mirror, which is arranged perpendicular to the propagation direction of the illuminating light beam, is mounted movable along the optical axis. The deflection mirror reflects back the illuminating light beam, so that after passing through the objective, the λ/4-plate and the tube lens, it passes back to the polarization beam splitter. The illuminating light beam arriving at the polarization beam splitter has a linear polarization direction rotated by 90 degrees due to passing through the correspondingly oriented λ/4-plate twice and is therefore reflected by the polarization beam splitter to another tube lens, which is followed by the actual illumination objective. By moving the deflection mirror, the position of the focus in the illumination plane can be moved along the propagation direction of the illuminating light beam.

In a particularly advantageous alternative embodiment, the optical axis of the illumination objective and the optical axis of the detection objective are aligned parallel or coaxial to one another, wherein it is nevertheless preferably provided that the optical axis of the detection objective is oriented perpendicular to the sample plane, in which the illuminating light beam illuminating the sample line propagates. Alternatively, or additionally, it may also be provided that the detection objective and the illumination objective are oriented opposite to one another and opposite each other and/or that spatially in between the detection objective and the illumination objective a sample holder is arranged, which defines an examination position for a sample to be examined. Such a design has the particular advantage that the light sheet microscope can be made particularly compact and robust, and that the examination position for the sample is particularly easy to access, so that a rapid and precise, successive transfer of the samples is possible into the examination position.

Such a device can advantageously have a means of deflection, which deflects the illuminating light beam and/or the depletion or switching light beam after it has passed through the illumination objective in such a way that they subsequently run in the sample plane. In particular, the means of deflection may be arranged such that the deflected illuminating light beam and/or the depletion or switching light beam has an angle different from zero degrees to the optical axis of the illumination objective and/or the detection objective. In particular, the illumination and sample plane can be aligned perpendicular to the optical axis of the illumination objective.

In particular, it can be advantageously provided that the illuminating light beam and/or the depletion or switching light beam initially run in the vertical direction through the illumination objective and then are deflected in the horizontal direction with the deflection device in order to illuminate the sample in the sample plane along the sample line.

The detection light emanating from the illuminated sample area, in particular fluorescent light, preferably runs in the vertical direction through a detection objective. Such a set-up allows the use of an upright or inverted standard microscope stand for the production of the device according to the invention.

In a particularly advantageous embodiment, it is provided that the illumination objective and the deflection device, which may comprise, for example, one or more deflection mirrors, are arranged to be movable relative to one another in order to be able to move the illuminating light beam and/or the depletion or switching light beam relative to the sample. Alternatively, or additionally, it can also be provided that the deflection device is fastened to the detection objective, in particular in a movable manner.

The device according to an embodiment of the invention may advantageously have a scanning microscope or a confocal scanning microscope and/or be manufactured by converting a scanning microscope or a confocal scanning microscope. In particular, the use of an inverted microscope stand is suitable. Of particular advantage in this respect is the use of a (possibly already present in a laboratory anyway) scanning microscope for carrying out the method according to the invention.

In the drawing, the device according to an embodiment of the invention is exemplified and shown schematically and will be described below with reference to the figures, wherein the same or the same elements or elements acting the same way are provided mainly with the same reference numbers.

FIG. 1 shows a schematic representation of an exemplary embodiment of the method according to the invention with reference to a detailed view of an exemplary embodiment of a device according to the invention.

The device includes at least one light source for generating an illuminating light beam 1 having at least one wavelength suitable for fluorescence excitation of the sample, and for generating a depletion or switching light beam 6 having at least one wavelength suitable for depletion of the sample. The device also includes an illumination objective 2 for focusing the illuminating light beam 1 and the depletion or switching light beam 6.

The illuminating light beam 1 and the depletion or switching light beam 6 are guided such that a sample to be examined is illuminated in a sample plane (with reference to FIG. 1, the sample plane is oriented horizontally and perpendicular to the plane of the drawing) along a sample line (referring to FIG. 1, the sample line is perpendicular to the plane of the drawing) with the illuminating light beam 1 propagating along the sample line and the depletion or switching light beam 6 in the sample plane overlaps at least partially spatially with the illuminating light beam 1. Referring to FIG. 1, the propagation direction of the illuminating light beam 1 and the depletion or switching light beam 6 are perpendicular to the plane of the drawing.

The device also includes detection optics which include a detection objective 4 and a tube lens 8 and which images detection light 7 emanating from the sample area illuminated by the illuminating light beam 1 along the sample line into a detection plane in which a slit detector 9 is arranged for a confocal line detection.

The slit detector 9 can be formed, in particular, by a part of an area detector arranged in the detection plane which is switched active. The area detector may be, for example, a CMOS detector or sCMOS detector. In this case, only a part of the area detector, namely the part that corresponds to the slit detector 9, is read out (the part switched active), while the remaining parts of the area detector, namely the parts that are outside the slit detector, are not read (the part switched not active).

In a first subregion 19, in which the probability of an interaction of the sample molecules with the depletion or switching light beam (6) is greater than 90%, in particular greater than 95%, very particularly greater than 99%, the fluorescence is effectively suppressed, so that the fluorescent light emanating from the central, actually interesting second subregion 20, which is surrounded by the first subregion 19 in sections, is not superimposed with unwanted fluorescent light from this first subregion 19. However, outside the first subregion 19, the intensity of the depletion or switching light beam 6 is not sufficient to effectively and reliably suppress interfering fluorescence. For this reason, the light coming from the regions (23) marked out with hatched lines in FIG. 1 is hidden and not detected by the slit detector.

In order to successively scan at least a portion of the sample plane, which represents the illumination plane, sample line for sample line, the illuminating light beam 1 is moved in the sample plane perpendicular to its propagation direction. With reference to FIG. 1, the movement takes place in the horizontal direction. The depletion or switching light beam 6 is moved here synchronously with the illuminating light beam 1. For this purpose, the device comprises at least one illumination beam deflecting device which can be adjusted with respect to the deflection angle in the beam path of the illuminating light beam 1 and the depletion or switching light beam 6.

The illuminating light beam 1 is formed as a sectioned Bessel beam. The depletion or switching light beam 6 has two maxima in the transverse cross section. If sectioned Bessel beams (see in particular FIGS. 2 to 4) are used for illumination, the respectively detected sample line can be illuminated, mainly, from the side. As a result, an overlap between the detection and excitation PSF is advantageously greatly minimized and the optical sectioning and the axial resolution are independent of the size of the image field. This can be achieved, in particular, by aligning the optical axis of the detection objective perpendicular to the illumination and sample plane.

A basic idea of the present invention is the combination of STED/Resolft-SPIM with the suppression of unwanted fluorescent light, for example by confocal line detection; this is advantageous in particular with the simultaneous use of sectioned Bessel beams. This advantageously minimizes the number of fluorophores to be depleted by using another technique which requires less power, in addition to STED.

Confocal line detection only, during illumination with a sectioned Bessel beam inherently has the limitation that the major maximum of a sectioned Bessel beam is necessarily elongated along the optical axis, and thus the achievable resolution may be worse than with ordinary Bessel beams (even if the optical sectioning is significantly better). The central maximum of a sectioned Bessel beam is independent of the depth of field of the beam and can therefore be easily chosen so that it is smaller than 2.4 µm. However, it can not be made smaller than approximately 0.6 µm for a numerical aperture of NA=0.4 (as opposed to a 0.4 µm numerical aperture for conventional Bessel beams), without increasing the overlap by increasing the opening angle θ of the ring system of the Bessel beam with the detection PSF and thereby deteriorating the image contrast.

Figure 8:
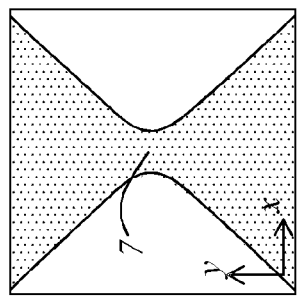
FIG. 8 shows the detection probability projected along the illumination axis.
Figure 7:
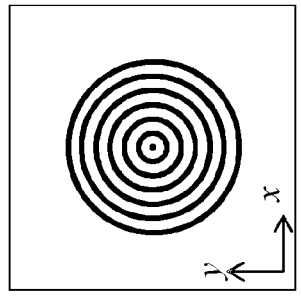
FIG. 7 shows a cross section through a sectioned Bessel beam for an opening angle of 90 degrees.
Figure 5:
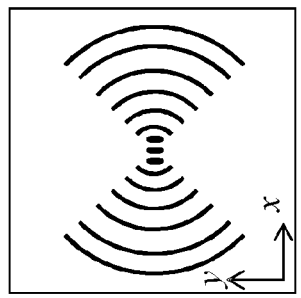
FIG. 5 shows a cross section through a Sectioned Bessel beam for an opening angle of 50 degrees.
Figure 3:
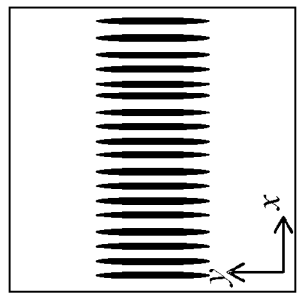
FIG. 3 shows a cross section through a sectioned Bessel beam for an opening angle of 10 degrees.

FIGS. 3, 5 and 7 each illustrate a cross section through a sectioned Bessel beam as the illuminating light beam 1, as can be used to carry out a method according to the invention, for different opening angles. FIG. 3 shows a cross section through a sectioned Bessel beam for an opening angle of 10 degrees, FIG. 5 for an opening angle of 50 degrees and FIG. 7 for an opening angle of 90 degrees. FIG. 8 illustrates the detection probability projected along the illumination axis.

Figure 6:
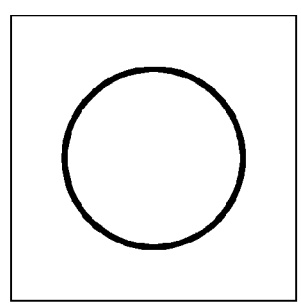
FIG. 6 shows schematically the illumination of the pupil of the illumination objective to produce a sectioned Bessel beam with an opening angle of 90 degrees.
Figure 4:
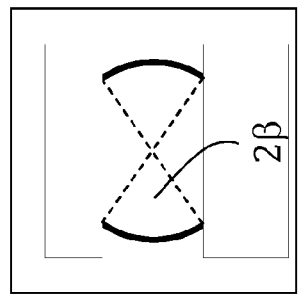
FIG. 4 shows schematically the illumination of the pupil of the illumination objective to produce a sectioned Bessel beam with an opening angle of 50 degrees.
Figure 2:
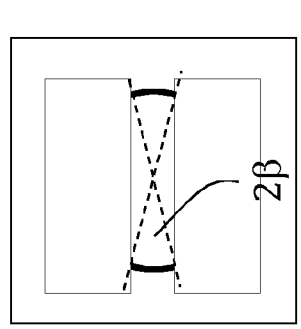
FIG. 2 shows a schematically the illumination of the pupil of the illumination objective to produce a sectioned Bessel beam with an opening angle of 10 degrees.

FIG. 2 shows schematically the illumination of the pupil of the illumination objective to produce a sectioned Bessel beam with an opening angle of 10 degrees. The resulting intensity distribution is the focus plane is shown in FIG. 3. FIG. 4 shows schematically the illumination of the pupil of the illumination objective to produce a sectioned Bessel beam with an opening angle of 50 degrees. The resulting intensity distribution is the focus plane is shown in FIG. 5. FIG. 6 shows schematically the illumination of the pupil of the illumination objective to produce a sectioned Bessel beam with an opening angle of 90 degrees. The resulting intensity distribution is the focus plane is shown in FIG. 7.

FIGS. 9 to 13 each show a schematic representation of the superposition of an illuminating light beam 1 with a depletion or switching light beam 6, as can be used to carry out a method according to the invention.

Figure 9:
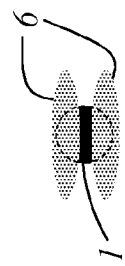
FIG. 9 shows a schematic representation of the superposition of a Gaussian illuminating light beam with a depletion or switching light beam having two laterally offset maxima.

FIG. 9 shows in a lateral cross section a schematic representation of a possible superposition of a Gaussian illuminating light beam 1 with a depletion or switching light beam 6 having two laterally offset maxima 6.

Figure 10:
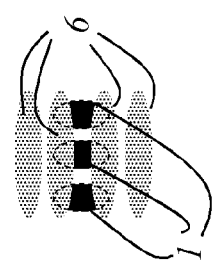
FIG. 10 shows a schematic representation of the superimposition of an illuminating light beam having a several maxima with a depletion or switching light beam having a several maxima.

FIG. 10 shows, in a lateral cross section, a schematic illustration of a possible superposition of an illuminating light beam 1 having several adjacent maxima (horizontally next to one another in the figure), with a depletion or switching light beam 6, which also has several spaced-apart maxima (vertically one above the other in the figure).

Figure 11:
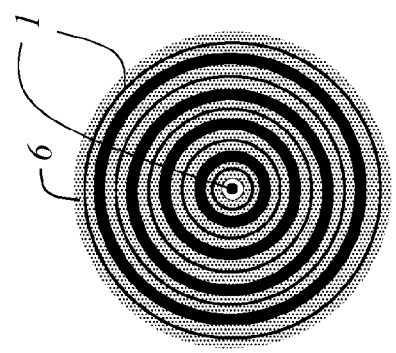
FIG. 11 shows a schematic representation of the superposition of an illuminating light beam with a depletion or switching light beam both being formed as Bessel beams.

FIG. 11 shows, in a lateral cross section, a schematic illustration of a possible superimposition of an illuminating light beam 1, which is formed as a Bessel beam, with a depletion or switching light beam, which is likewise designed as a Bessel beam.

Figure 12:
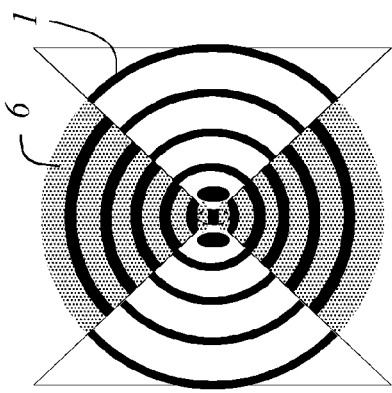
FIG. 12 shows a schematic representation of the superposition of an illuminating light beam with a depletion or switching light beam being formed as crossed and sectioned Bessel beams.

FIG. 12 shows in a lateral cross section a schematic representation of the possible superposition of an illuminating light beam 1 with a depletion or switching light beam 6 being formed as crossed and sectioned Bessel beams or Mathieu beams.

Figure 13:
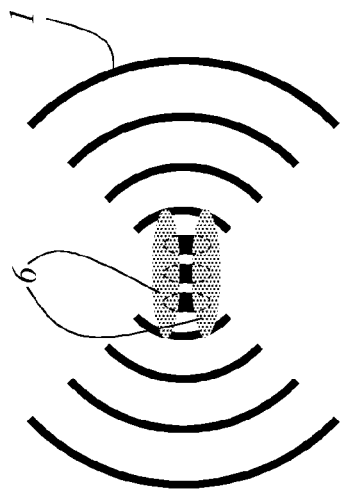
FIG. 13 shows a schematic representation of the superimposition of a cross sectioned Bessel beam formed illuminating light beam with a depletion or switching light beam having a central minimum.

FIG. 13 shows a schematic representation of the superimposition of an illuminating light beam which is formed as cross sectioned Bessel beam with a depletion or switching light beam having a central minimum.

FIGS. 14 and 15 show a schematic illustration of a conventional detection in SPIM, wherein FIG. 14 shows the relationships in the x-y plane, while FIG. 15 shows the relationships in the y-z plane, whereby advantageously for illumination an illuminating light beam in the form of a sectioned Bessel beam is used.

The illuminating light beam 1 is focused by means of an illumination objective 2 to illuminate a sample line lying in the x-z plane. The propagation direction of the illuminating light beam 1 runs along the sample line. In order to scan a sample plane lying in the x-z plane, the illuminating light beam 1 is moved in the x-z plane and the sample plane is scanned successively sample line by sample line. The detection light 7 emanating from the sample is collected by means of a detection objective 4 whose optical axis is oriented perpendicular to the sample plane and imaged into a detection plane 5.

FIGS. 14 and 15 show a schematic illustration of a confocal line detection in SPIM, as can be used when carrying out a method according to the invention. An improved resolution is already achieved because only the area is detected in which the illuminating light beam delivers the best axial resolution (ability to separate two pumps along the optical axis) and the best optical sectioning (optical layer thickness, i.e. the width of the area around the focal plane from which much of the fluorescence is detected). Due to the additional superposition of the depletion or switching light beam 6, an additional increase in resolution and contrast is achieved according to the invention, which is explained in detail below, in particular with reference to FIG. 20.

FIGS. 16 and 17 illustrate schematically the principle of confocal line detection in illumination along a sample line as may be used to perform a method of the invention. The illumination takes place with an illuminating light beam 1, which has a long-drawn focus 11. From the sample area illuminated by the illuminating light beam 1 only the part of detection light is detected, which is emitted from a detection area 10, which is defined by the width and the position of the slit detector 9 which is arranged in the detection plane optically corresponding to the sample plane.

The detection area 10 is chosen to be so large and aligned and arranged in a way that it includes both a first subregion 19 in which the probability of an interaction of the sample molecules with the depletion or switching light beam 6 is greater than 90%, in particular greater than 95%, very particularly greater than 99%, as well as a second subregion 20 surrounded by the first subregion 19 at least in sections and/or in which the depletion or switching light beam 6 has a zero point.

The slit width direction (with respect to the figure horizontally in the drawing plane) of the slit detector 9 is aligned parallel to the longitudinal direction of the image of the sample line in the detection plane. Detection light emanating from sample areas which are outside the detection area 10 defined by the slit detector 9 used are not detected by the slit detector 9, so that disturbing fluorescent light originating from areas where suppression by the depletion or switching light beam 6 only is insufficiently possible, is not detected at least to a considerable extent. In the embodiment shown in FIGS. 16 and 17, lateral suppression of unwanted fluorescent light takes place.

In this example, the slit detector 9 is part of an area detector 12. Specifically, the slit detector 12 is formed by a part of an area detector 12 arranged in the detection plane which is switched active. The area detector may be, for example, a CMOS detector or sCMOS detector. In each case, only the part of the area detector 12, which just corresponds to the slit detector, is read out (the part switched active), while the remaining parts of the area detector, namely the parts that are outside the slit detector 9, are not read (the part switched inactive). Preferably, at least part of the sample plane is scanned successively by moving the overlapping area. By moving the overlapping area of illuminating light beam 1 and depletion or switching light beam 6 perpendicular to the light propagation direction, the sample area of interest in the sample plane is scanned successively. The movements of the illuminating light beam 1 and of the depletion or switching light beam 6 which are executed are indicated by the arrows 3.

FIGS. 18 and 19 schematically illustrate another exemplary embodiment of the invention. In this exemplary embodiment, at least a part of the sample plane is scanned successively by moving a focus, in particular comparatively short focus, of the illuminating light beam 1 together with the focus of the depletion or switching light beam 6 in the light propagation direction, i.e. along the sample line.

Also, in this embodiment, only the part of fluorescent light originating from a specific detection area 10 is detected from a sample area illuminated by the illuminating light beam 1, wherein the detection area 10 is defined by the width and the position of a slit detector 9 arranged in the detection plane optically corresponding to the sample plane.

Also in this embodiment the detection area 10 is chosen to be so large and aligned and arranged in a way that it includes both a first subregion 19 in which the probability of an interaction of the sample molecules with the depletion or switching light beam 6 is greater than 90%, in particular greater than 95%, very particularly greater than 99%, as well as a second subregion 20 surrounded by the first subregion 19 at least in sections and/or in which the depletion or switching light beam 6 has a zero point.

In this embodiment, the detector is designed as a slit detector 9 on the basis of an area detector 12, wherein the slit width direction is aligned parallel to the longitudinal direction of the image of the sample line in the detection plane. In this way, an axial suppression of unwanted fluorescent light is achieved.

As soon as the part of the sample plane to be examined has been traversed along a sample line, the process can be repeated continuously along the respectively adjacent sample line until the part of the sample plane to be examined has been scanned in two dimensions.

Figure 20:
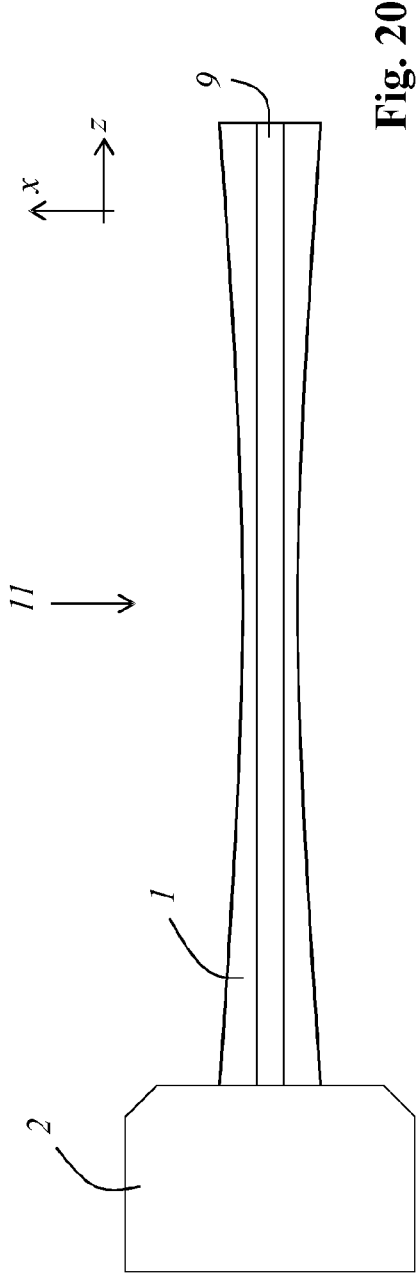
FIG. 20 shows a schematic illustration of the principle of a confocal line detection, as it can be used for carrying out a method according to the invention, in the illumination of a sample line by means of an illuminating light beam having a long-drawn focus.

FIG. 20 illustrates schematically the principle of confocal line detection in illumination of a sample line as may be used to perform a method of the invention. The illumination takes place with an illuminating light beam 1, which has a long-drawn focus 11. From the sample area illuminated by the illuminating light beam 1 only the part of detection light is detected, which is emitted from a detection area 10, which is defined by the width and the position of the slit detector 9 (not drawn in this figure). Detection light emanating from sample areas which are outside the detection area 10 defined by the used slit detector 9 are not detected by the slit detector 9.

Figure 21:
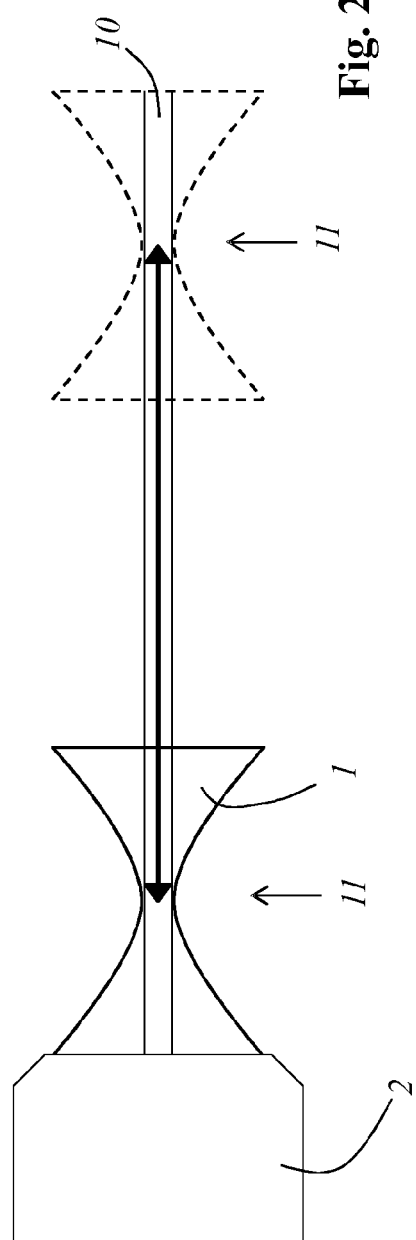
FIG. 21 shows a schematic illustration of the principle of a confocal line detection, as it can be used for carrying out a method according to the invention, in the illumination of a sample line by means of an illuminating light beam having a short focus which is moved back and/or forwards during the detection in the direction of the light propagation direction.

FIG. 21 shows a schematic illustration of the principle of a confocal line detection, as it can be used for carrying out a method according to the invention, wherein a sample line is illuminated by means of an illuminating light beam 1 which has a short focus 11. The focus 11 is moved forward and/or backward during the detection in the direction of the light propagation. This embodiment allows to scan the sample line successively, in particular continuously, with the radially spatially very narrow focus 11 of the illuminating light beam 1, which is superimposed with a correspondingly narrow focus of depletion or switching light beam 6, whereby an even further increased resolution can be achieved. In this case, advantage is taken of the fact that the focus 11 can have a substantially small beam diameter in the beam waist (location of the smallest diameter) than the focus 11 in the embodiment according to FIG. 12.

Figure 22:
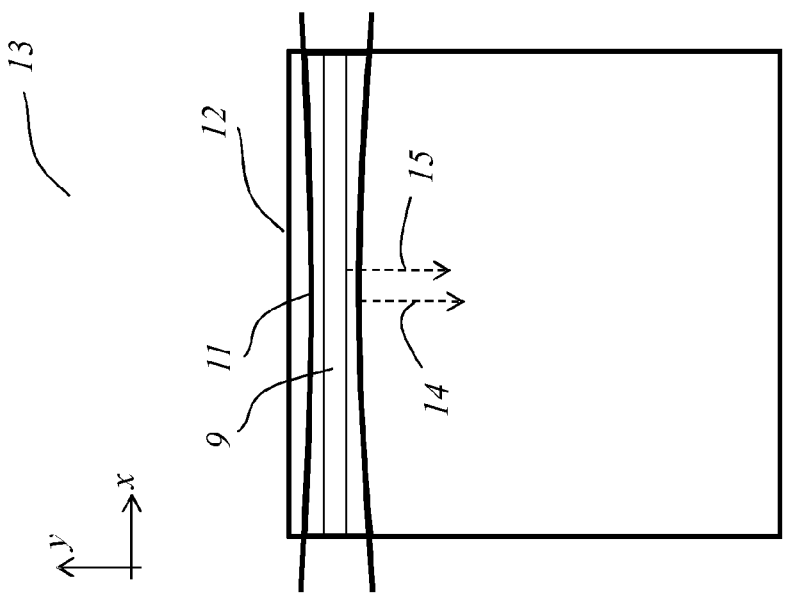
FIG. 22 shows a schematic representation of the detection in the case of illumination with a long-drawn focus.

FIG. 22 shows a schematic representation of the detection in the case of illumination with an illuminating light beam 1 with a long-drawn focus 11, as described above with reference to FIG. 12.

The detection optics images the detection light 7 emanating from the illuminated area into a detection plane (with reference to FIG. 14: the plane of the drawing) in which an area detector 12 is arranged. In the area of the image 13 of the illuminated sample area, a slit detector 9 is arranged which is formed by the respectively switched active part of an area detector 12. The slit width direction of the slit detector 9 is aligned perpendicular to the longitudinal extension direction of the image 13 of the illuminated sample area.

In order to successively scan at least a planar part of the sample plane, sample line for sample line, the illuminating light beam 1 in the sample plane is moved perpendicular to its propagation direction and together with the depletion or switching light beam 6. Accordingly, the image 13 of the illuminated sample area shifts in the detection plane, which is illustrated by the arrow 14. The slit detector 9 is moved synchronously by appropriately activating and inactivating the pixels of the area detector 12, which is illustrated by the arrow 15.

Figure 23:
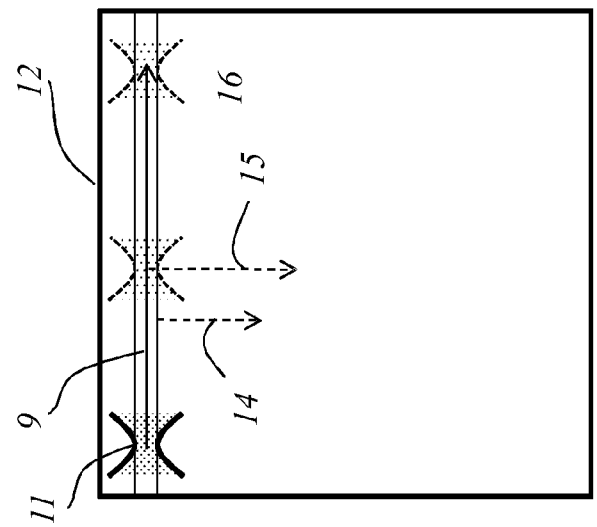
FIG. 23 shows a schematic representation of the detection in the case of illumination with a short focus.

FIG. 23 shows a schematic illustration of the detection in illumination with an illuminating light beam 1 with a short focus 11, as described above with reference to FIGS. 18 and 19. According to the axial displacement of the focus 11 of the illuminating light beam 1, the image of the sample area illuminated by the focus 11 moved along the longitudinal extension direction of the slit detector 9, which is illustrated by the double arrow 16. In this embodiment, the detector is formed preferably as a slit detector 9, wherein the slit width direction is aligned parallel to the longitudinal extension direction of the image of the sample line in the detection plane. In this way, an axial suppression of the unwanted fluorescent light is achieved. As soon as the part of the sample plane to be examined has been traversed along a sample line, the process can be repeated continuously along the respectively adjacent sample line until the part of the sample plane to be examined has been scanned in two dimensions. The movement of the illuminating light beam 1 and the depletion or switching light beam 6 to the next sample lines is indicated by the arrows 14 and 15.

Figure 24:
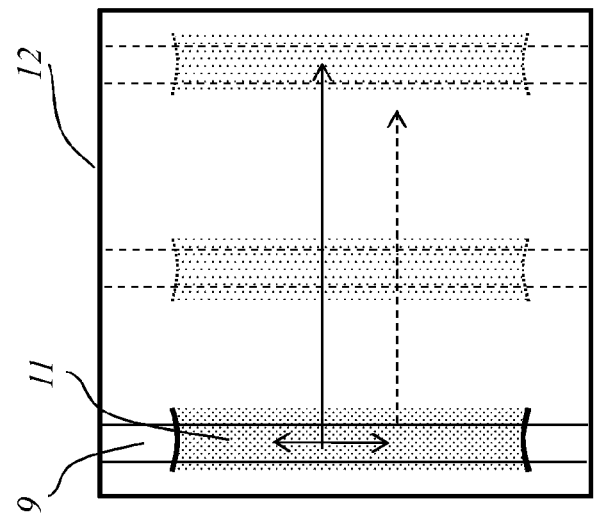
FIG. 24 shows a schematic representation of the detection in the case of illumination with a short but laterally particularly wide focus.

FIG. 24 shows a schematic illustration of the detection in the case of illumination with an illuminating light beam 1 with a short but laterally very extensive focus 11 of the illuminating light beam 1 and the depletion or switching light beam 6. In this embodiment, the region of interest in the sample plane of the sample can be scanned by a single scan along the sample line. Also, in this embodiment, the detector is formed preferably as a slit detector 9, wherein the slit width direction is aligned parallel to the longitudinal extension direction of the image of the sample line in the detection plane.

FIGS. 25 to 27 show a schematic representation of the intensity distributions of the excitation light beam 1 (FIG. 25) and the depletion or switching light beam 6 (FIG. 26) which has a zero point 22 along the optical axis (z-axis), and the intensity distribution of the resulting fluorescence (FIG. 27) to illustrate a possible embodiment of the invention.

There is no effective fluorescence suppression by STED in regions 18 (drawn hatched) in front of and behind the beam waist, because the light power density is too low. Effective fluorescence suppression by STED occurs only in the first subregion 19.

In order to avoid that unwanted fluorescent light is detected together with the actually to be detected fluorescent light, originating from a second subregion 20, the fluorescent light emanating from the areas 18 in front of and behind the beam waist is suppressed and not detected.

Rather, only the part of the fluorescence light emanating from the sample plane is detected as detection light, from a first subregion 19 and a second subregion 20, which is surrounded at least in sections by the first subregion 19, whereby fluorescence from the first subregion 19 due to the high power density of the depletion or switching light beam 6 is almost completely suppressed. The fluorescent light originating from outside the first subregion 19 and the second subregion 20 in the axial direction is suppressed, for example with a slit detector. In the embodiment shown in FIG. 27, axial suppression of unwanted fluorescent light thus takes place.

FIG. 31 shows a schematic representation of a transverse cross section of the superposition of an illuminating light beam with a depletion or switching light beam according to the prior art (STED-SPIM). FIGS. 32 to 34 show a schematic representation of the STED efficiency at different positions, namely before the location of the minimum beam radius (z<0) (FIG. 32), at the location of the minimum beam radius (z=0) (FIG. 33) and after the location of the minimum beam radius (z>0) (FIG. 34).

FIGS. 28 to 30 and 31 to 34 illustrate that for the examination of a sample by means of a combination of STED and SPIM—seen alone—with Gaussian illumination and especially in illumination with Bessel beams, disadvantageously an extremely high power of the depletion beam is necessary in order to exceed a minimum intensity threshold 21 for effective depletion.

In particular, the ring system can be depleted disadvantageously only very difficult by a STED beam because the intensity in the depletion beam is not sufficient. This is because the excitation beam has a diffraction-limited cross section that scales with the depth of field of the excitation beam. For Gaussian beams, the depth of field dz (Rayleigh range×2) is linked to the beam diameter. $D=\sqrt{(\lambda dz/\pi)}$ applies, where $\lambda$ is the wavelength in the medium. An image field of dz=50 µm is illuminated by a beam, which is thus d=2.4 µm deep (1/e width) at the waist. The depletion area for a layer thickness of e.g. 0.1 µm is therefore 2.3 µm deep.

Therefore, STED depletion away from the location of the narrowest beam diameter (z=0) is extremely difficult to realize due to the diffraction-related beam expansion and concomitant reduction in light power density. It is therefore not possible to effectively conduct a sample examination based solely on STED-SPIM with a long focus 11; not even if the focus 11 is axially shortened and axially moved. Only the combination according to the invention with a suppression of the fluorescent light, which originates from outside the first and second subregion, leads to be able to achieve a significantly higher resolution with good image contrast, which is illustrated in particular by FIG. 35.

FIG. 35 schematically illustrates the improvement of the axial resolution in the area of the beam waist 17 (location of the smallest beam diameter) by the superimposition of a depletion or switching light beam 6 having a high power density there due to focusing, and additionally the improvement by the suppression of the unwanted detection light in the areas 18 in front of and behind the beam waist 17 (location of the smallest beam diameter) by confocal line detection, which causes only detection light to be detected, which originates from the detection area 10. The focus 11 is moved forwards and/or backwards during the detection of a sample line in the direction of the light propagation in order to continuously scan the sample line, which is indicated by the double arrow. After scanning the sample line, the next, in particular the parallel adjacent, sample line can be scanned in the same way and so on.

Figure 37:
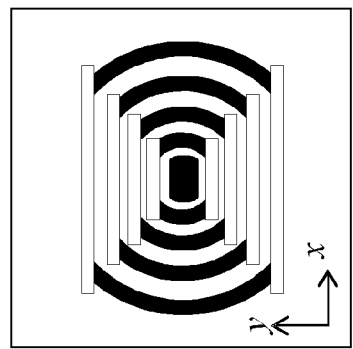
FIGS. 37 and 38 show an illustration of the spatial position change of the illuminating light beam due to the additional modulation.
Figure 38:
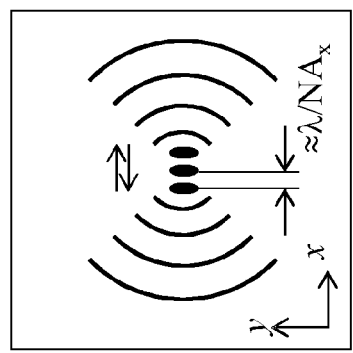
Figure 36:
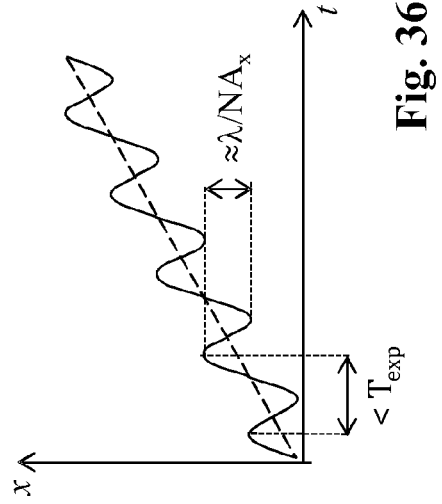
FIG. 36 shows schematically a graphical representation of the control signal for moving the overlap area, wherein the position of the illuminating light beam is additionally modulated to the moving.

FIG. 36 schematically shows a graphical representation of the time profile of the drive signal for moving the overlapping area of illuminating light beam 1 and depletion or switching light beam 6, in the direction of the x-axis, wherein the position of the illuminating light beam is additionally modulated to the movement. The position of the illuminating light beam 1 is modulated in addition to moving the overlapping area at a frequency greater than three times $t_{exp}$, where $t_{exp}$ is the exposure time of the detector and having an amplitude equal to $\lambda/NAx$ in the sample volume, where $\lambda$ is the Wavelength of the illumination light and NAx is the numerical aperture under which the x-direction is focused. As a result, the position of the 5 illuminating light beam 1 is additionally impressed with a wavering motion of $\lambda/NAx$ (FIG. 37), so that the individual maxima of the illuminating light beam 1 are effectively wider, as shown in FIG. 38.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Primary illuminating light beam
2 Illumination objective
3 Arrow
4 Detection objective
5 Detection plane
6 Depletion or switching light distribution
7 Detection light
8 Tube lens
9 Slit detector
10 Detection area
11 Focusing unit
12 Area detector
13 Image of the illuminated sample area
14 Arrow
15 Arrow
16 Double arrow
17 Beam waist
18 Areas in front and behind the beam waist
19 First subregion
20 Second subregion
21 Intensity threshold
22 Zero point

The invention claimed is:

1. A method for the examination of a sample, the method comprising:
  a. illuminating the sample in a sample plane along a sample line with an illuminating light beam propagating along the sample line and having at least one wavelength suitable for fluorescence excitation of the sample,
  b. acting upon the sample by a depletion or switching light beam, which overlaps in the sample plane in an overlap region at least partially spatially with the illuminating light beam and which has at least one wavelength suitable for depletion of the sample, and
  c. detecting a part of fluorescent light emanating from the sample plane as detection light originating from a first subregion of the overlap region, in which the probability of an interaction of the sample molecules with the depletion or switching light beam is greater than 90%, and/or originating from a second subregion which is at least partially surrounded by the first sub-region and/or in which the depletion or switching light beam has a zero point, while at the same time the fluorescent light originating from outside the first subregion and the second subregion is at least partially suppressed and not detected.

2. The method according to claim 1, wherein the illuminating light beam is one of a Gaussian beam, a Bessel beam, a sectioned Bessel beam or a Mathieu beam.

3. The method or device according to claim 1, wherein:
  a. the depletion or switching light beam has the same propagation direction as the illuminating light beam, and/or
  b. the depletion or switching light beam has a direction of propagation parallel to the direction of propagation of the illuminating light beam, and/or
  c. the depletion or switching light beam has a circular-symmetrical cross-sectional profile or in cross section two maxima which are arranged symmetrically about a zero point, and/or
  d. the depletion or switching light beam is formed from at least one Laguerre-Gaussian or Laguerre-Bessel beam.

4. The method according to claim 1, wherein:
a. at least part of the sample plane is scanned successively, and/or
b. at least a part of the sample plane is scanned successively by moving the overlapping area by moving a focus of the illuminating light beam in the sample plane, wherein a focus of the depletion or switching light beam is moved synchronously with the focus of the illuminating light beam, and/or
c. at least a part of the sample plane is scanned successively by moving the overlapping area by moving a focus of the illuminating light beam in the sample plane in the light propagation direction and a focus of the depletion or switching light beam is moved synchronously with the focus of the illuminating light beam in the light propagation direction is moved, and/or
d. at least a part of the sample plane is scanned successively by moving the overlapping area by moving a focus of the illuminating light beam in the sample plane perpendicular to the light propagation direction and a focus of the depletion or switching light beam perpendicular to the focus of the illuminating light beam is also moved in direction of the light propagation.

5. The method according to claim 4, wherein the position of the illuminating light beam and/or the depletion or switching light beam is modulated in addition to the movement with a frequency which is greater than three times $t_{exp}$, where $t_{exp}$ is the exposure time of the detector, and with an amplitude corresponding in the sample volume at least $\lambda/NA$ where $\lambda$ is the wavelength of the illumination light and NA is the numerical aperture under which the illuminating light beam is focused.

6. The method according to claim 4, wherein the illuminating light beam and/or the depletion or switching light beam is moved in the sample plane relative to the sample by at least one illumination beam deflection device, which is adjustable with respect to the deflection angle.

7. The method according to claim 4, wherein the detection light is detected by a respectively switched active part of an area detector arranged in a detection plane.

8. The method according to claim 7, wherein:
a. successively different parts of the area detector are switched to be active synchronously with the movement of the overlapping area, and/or
b. the area detector is switched such that the respectively switched active part follows movement of the image of the first and second subregion in the detection plane.

9. The method according to claim 1, wherein the detection light is detected by a slit detector.

10. The method according to claim 9, wherein a slit width direction of the slit detector is aligned perpendicular to a longitudinal extension direction of the image of the sample line in the detection plane.

11. The method according to claim 9, wherein a slit width direction of the slit detector is aligned parallel to a longitudinal extension direction of the image of the sample line in a detection plane.

12. The method according to claim 11, wherein a confocal line detection of the detection light takes place, which emanates from the sample area illuminated by the illuminating light beam along the sample line.

13. The method according to claim 9, wherein the slit detector is a respectively switched active part of an area detector arranged in a detection plane.

14. The method according to claim 13, wherein:
a. the slit detector is moved in the detection plane synchronously with a movement of the illuminating light beam in the illumination plane, and/or
b. the slit detector is moved in the detection plane by successive active switching and inactive switching of respectively adjacent parts of the area detector, and/or
c. the slit detector is moved in the detection plane by successive active switching and inactive switching of respectively adjacent parts of the area detector in the slit width direction.

15. The method according to claim 9, wherein the slit detector has an area detector arranged in the detection plane, in front of which is a slit aperture.

16. The method according to claim 15, wherein the area detector is switched active with respect to its entire sensor surface.

17. The method according to claim 15, wherein the slit aperture is moved synchronously to a movement of the illuminating light beam in the illumination plane.

18. The method according to claim 15, wherein:
a. the slit aperture is formed by a non-mechanical component, and/or
b. the slit aperture has an SLM (spatial light modulator), and/or
c. the slit aperture is formed by the respectively switched translucent part of a SLM (spatial light modulator).

19. The method according to claim 18, wherein the slit aperture is moved by successive translucent switching and opaque switching of respectively adjacent parts of the SLM (spatial light modulator).

20. The method according to claim 9, wherein the detection light is deflected to a fixed slit detector relative to the sample, and/or relative to a detection objective by a detection beam deflection device which is arranged in the detection beam path and which is adjustable with respect to a deflection angle which is controlled synchronously with a movement of the illuminating light beam.

21. The method according to claim 1, wherein a focus of the illuminating light beam and/or a focus of the depletion or switching light beam is moved parallel to a propagation direction of the illuminating light beam and along the sample line during the detection.

22. The method according to claim 21, wherein the focus of the illuminating light beam and/or the focus of the depletion or switching light beam is moved by changing the length of the optical path of the illuminating light beam by changing the geometric length of the light path and/or by changing a refractive index of an optical component arranged in the optical path.

23. The method according to claim 21, wherein the illuminating light beam in the sample plane is moved successively perpendicular to its direction of propagation, and so at least a portion of the sample plane is scanned sample line for sample line, wherein during scanning a sample line, the focus of the illuminating light beam is moved along the respective sample line.

24. A device configured to carry out the according to claim 1.

* * * * *